(12) United States Patent
Yanagihara et al.

(10) Patent No.: US 8,790,827 B2
(45) Date of Patent: Jul. 29, 2014

(54) POSITIVE ELECTRODE ACTIVE MATERIAL, NONAQUEOUS ELECTROLYTE BATTERY AND METHOD FOR MANUFACTURING POSITIVE ELECTRODE ACTIVE MATERIAL

(75) Inventors: Asuki Yanagihara, Fukushima (JP); Tomoyo Ooyama, Fukushima (JP); Yoshihiro Kudo, Tokyo (JP); Guohua Li, Saitama (JP)

(73) Assignee: Sony Corporation (JP)

( * ) Notice: Subject to any disclaimer, the term of this patent is extended or adjusted under 35 U.S.C. 154(b) by 319 days.

(21) Appl. No.: 13/157,465

(22) Filed: Jun. 10, 2011

(65) Prior Publication Data
US 2012/0009474 A1      Jan. 12, 2012

(30) Foreign Application Priority Data

Jul. 8, 2010 (JP) ................. 2010-155702

(51) Int. Cl.
*H01M 4/525* (2010.01)
*H01M 4/54* (2006.01)
*H01M 4/36* (2006.01)
*B05D 5/12* (2006.01)

(52) U.S. Cl.
USPC ........... 429/219; 429/223; 429/221; 429/220; 252/182.1; 427/126.6

(58) Field of Classification Search
None
See application file for complete search history.

(56) References Cited

U.S. PATENT DOCUMENTS

2010/0285366 A1* 11/2010 Endoh ..................... 429/231.95

* cited by examiner

*Primary Examiner* — Barbara Gilliam
*Assistant Examiner* — Angela Martin
(74) *Attorney, Agent, or Firm* — Sheridan Ross P.C.

(57) ABSTRACT

A positive electrode active material includes: a secondary particle obtained upon aggregation of a primary particle that is a lithium complex oxide particle in which at least nickel (Ni) and cobalt (Co) are solid-solved as transition metals, wherein an average composition of the whole of the secondary particle is represented by the following formula (1):

$$Li_xCo_yNi_zM_{1-y-z}O_{b-a}X_a \quad \text{Formula (1)}$$

wherein an existent amount of cobalt (Co) becomes large from a center of the primary particle toward the surface thereof; and an existent amount of cobalt (Co) in the primary particle existing in the vicinity of the surface of the secondary particle is larger than an existent amount of cobalt (Co) in the primary particle existing in the vicinity of the center of the secondary particle.

10 Claims, 5 Drawing Sheets

POSITIVE ELECTRODE ACTIVE MATERIAL, NONAQUEOUS ELECTROLYTE BATTERY AND METHOD FOR MANUFACTURING POSITIVE ELECTRODE ACTIVE MATERIAL

FIELD

The present disclosure relates to a positive electrode active material, a nonaqueous electrolyte battery and a method for manufacturing a positive electrode active material. In more detail, the present disclosure relates to a positive electrode active material in which an existent amount of cobalt (Co) on the particle surface relative to the whole of the particle is large, a nonaqueous electrolyte battery and a method for manufacturing a positive electrode active material.

BACKGROUND

In recent years, following the spread of portable appliances such as video cameras and laptop personal computers, there has been an increased demand for small-sized and high-capacity secondary batteries. Almost all of secondary batteries are a nickel-cadmium battery or a nickel-hydrogen battery each using an alkaline electrolytic solution. However, in such a battery, the voltage is low as about 1.2 V, and it is difficult to enhance an energy density. For that reason, studies have been made regarding a lithium secondary battery using a lithium metal, which has a specific gravity of 0.534, a value of which is the lowest among solid simple substances, is also extremely poor in a potential and has the largest current capacity per unit weight among metal negative electrode materials.

However, in secondary batteries using a lithium metal for a negative electrode, dendritic lithium (dendrite) is deposited on the surface of the negative electrode at the time of charge and grows with the progress of a charge/discharge cycle. Not only the growth of the dendrite deteriorates a cycle characteristic of the secondary battery, but in the worst case, the grown dendrite breaks through a separator that is a diaphragm disposed so as to prevent a positive electrode and a negative electrode from being in contact with each other, whereby the positive electrode and the negative electrode cause an electrical short circuit.

Then, for example, as disclosed in Patent Document 1 (JP-A-62-90863), there was proposed a secondary battery in which a carbonaceous material such as cokes is used for a negative electrode, and charge/discharge is repeated by doping and dedoping an alkali metal ion. According to this, it has been noted that the foregoing deterioration problem of the negative electrode in repeating charge/discharge can be suppressed.

On the other hand, as to positive electrode active materials, as a result of search and development of an active material exhibiting a high potential, materials exhibiting a battery voltage of about 4 V have appeared and attracted attention. As such an active material, there are known inorganic compounds such as alkali metal-containing transition metal oxides or transition metal chalcogens. Above all, $Li_xCoO_2$ ($0<x\leq1.0$), $Li_xNiO_2$ ($0<x\leq1.0$) and the like are the most promising from the standpoints of high potential, stability and long life. Of these, in particular, positive electrode active materials mainly composed of $LiNiO_2$ are a positive electrode active material exhibiting a relatively high potential and are high in a discharge current capacity, and they are expected to enhance an energy density.

On the other hand, in a secondary battery using a positive electrode active material composed of a lithium transition metal complex oxide mainly made of nickel, there are encountered such problems that an internal pressure rises following the generation of a gas in the inside of the battery; and that in a laminate-enclosed battery, blister is easily caused. Thus, it is demanded to solve these problems.

As techniques for solving these problems, Patent Documents 2 (JP-A-6-111820) and 3 (JP-A-6-215800) propose the removal of impurities of a positive electrode active material by washing the active material with water. Also, in Patent Document 4 (JP-T-2004-533104), there is made an attempt to prevent the generation of a gas by coating $LiCoO_2$ on a positive electrode active material made of a lithium transition metal complex oxide mainly composed of nickel.

SUMMARY

However, according to the foregoing Patent Documents 1 and 2, there is encountered such a problem that when the positive electrode active material made of a lithium transition metal complex oxide mainly composed of nickel is water with water, an Li ion in the active material is easily replaced by an H ion in water. When the Li ion is replaced by the H ion, even in the case where after water washing, calcination is again performed, since the amount of the Li ion in the active material is reduced, the capacity is lowered. Also, in the case of performing drying at a relatively low temperature of not higher than 300° C., since the H ion remains in the active material, the generation amount of a gas to be caused due to the H ion within the battery becomes very large.

Furthermore, in order to correct the reduction of the capacity, in the case where after water washing, an Li salt is added, followed by drying and calcination, it may be impossible to sufficiently diffuse the Li ion into the positive electrode active material, so that the Li ion remains in the vicinity of the surface. The Li salt which has not sufficiently completely reacted absorbs carbon dioxide in air to convert into lithium carbonate, whereby the resultant is decomposed within the battery, thereby causing the generation of a gas, too.

Also, Patent Document 3 gives, as experimental evidence, the matter that Co is coated or inclinedly solid-solved on a surface layer of a positive electrode active material particle that is the lithium transition metal complex oxide according to asymmetric peaks of XRD (X-ray diffraction spectroscopy). However, this may not be direct evidence. Furthermore, in Patent Document 3, a calcination temperature of the substrate active material is high, and adequate diffusion of Co into the particle at calcination after coating does not proceed, and therefore, it may be considered that uniform coating and inclined solid-solution onto the particle is difficult. For that reason, for example, there may be considered a possibility that a fine particle of a coating material $LiCoO_2$ or the like remains in the active material, and hence, such a material is not desirable as the active material.

At present, a positive electrode active material made of a lithium transition metal complex oxide mainly composed of nickel is expected as a positive electrode active material of a battery with a high discharge current capacity and a high energy density. On the other hand, in a battery using a positive electrode active material made of a lithium transition metal complex oxide mainly composed of nickel, there is involved such a problem that following the generation of a gas in the inside of the battery, a rise of the internal pressure of the battery or the battery blister of a laminate-enclosed battery is easy to occur. Thus, it is demanded to solve this problem.

Thus, it is desirable to provide a positive electrode active material, a positive electrode for nonaqueous electrolyte battery and a nonaqueous electrolyte battery, each of which is capable of simultaneously contributing to high capacity and suppression of the generation of a gas.

An embodiment of the present disclosure is directed to a positive electrode active material composed of a secondary particle obtained upon aggregation of a primary particle that is a lithium complex oxide particle in which at least nickel (Ni) and cobalt (Co) are solid-solved as transition metals, wherein an average composition of the whole of the secondary particle is represented by the following formula (1);

an existent amount of cobalt (Co) becomes large from a center of the primary particle toward the surface thereof; and an existent amount of cobalt (Co) in the primary particle existing in the vicinity of the surface of the secondary particle is larger than an existent amount of cobalt (Co) in the primary particle existing in the vicinity of the center of the secondary particle.

$$Li_xCo_yNi_zM_{1-y-z}O_{b-a}X_a \quad \text{Formula (1)}$$

In the formula (1), M represents at least one element selected from the group consisting of born (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb) and antimony (Sb); X represents a halogen atom; and x, y, z, a and b are values falling within the ranges of $(0.8 < x \le 1.2)$, $(0 < y \le 0.5)$, $(0.5 \le z \le 1.0)$, $(1.8 \le b \le 2.2)$ and $(0 \le a \le 1.0)$, respectively.

Another embodiment of the present disclosure is directed to a nonaqueous electrolyte battery including:

a positive electrode having a positive electrode active material-containing positive electrode active material layer provided on a positive electrode collector;

a negative electrode;

a nonaqueous electrolyte; and a separator, wherein the positive electrode active material is composed of a secondary particle obtained upon aggregation of a primary particle that is a lithium complex oxide particle in which at least nickel (Ni) and cobalt (Co) are solid-solved as transition metals;

an average composition of the whole of the secondary particle is represented by the foregoing formula (1);

an existent amount of cobalt (Co) becomes large from a center of the primary particle toward the surface thereof; and an existent amount of cobalt (Co) in the primary particle existing in the vicinity of the surface of the secondary particle is larger than an existent amount of cobalt (Co) in the primary particle existing in the vicinity of the center of the secondary particle.

Still another embodiment of the present disclosure is directed to a method for manufacturing of a positive electrode active material including:

forming a precursor composed of a lithium complex oxide in which at least nickel (Ni) and cobalt (Co) are solid-solved as transition metals;

subjecting the precursor to first calcination at from 450° C. to 650° C.;

coating a cobalt compound in a solution on the precursor calcined in the first calcination; and subjecting the precursor having a cobalt compound coated thereon to second calcination at a temperature higher than that of the first calcination.

According to the embodiments of the present disclosure, since the lithium complex oxide mainly composed of nickel (Ni) is used as the positive electrode active material, a high discharge capacity is obtainable. Then, in view of the facts that the positive electrode active material is composed of a secondary particle and that the existent amount of cobalt (Co) in the vicinity of the surface of the primary particle constituting the secondary particle is larger than the existent amount of the cobalt (Co) of the whole of the primary particle, oxidation activity on the surface of the primary particle can be suppressed. Also, similarly, in view of the fact that the existent amount of cobalt (Co) in the primary particle existing in the vicinity of the surface of the secondary particle is larger than the existent amount of cobalt (Co) in the primary particle existing in the vicinity of the center of the secondary particle, oxidation activity on the surface of the secondary particle can be suppressed.

According to the embodiments of the present disclosure, since the lithium complex oxide mainly composed of nickel (Ni) as a whole is used for the positive electrode active material, not only a high discharge capacity is obtainable, but oxidation activity on the surface of the positive electrode active material is suppressed, and decomposition of the nonaqueous electrolyte is suppressed, thereby enabling one to suppress the generation of a gas.

DETAILED DESCRIPTION

Figure 1:
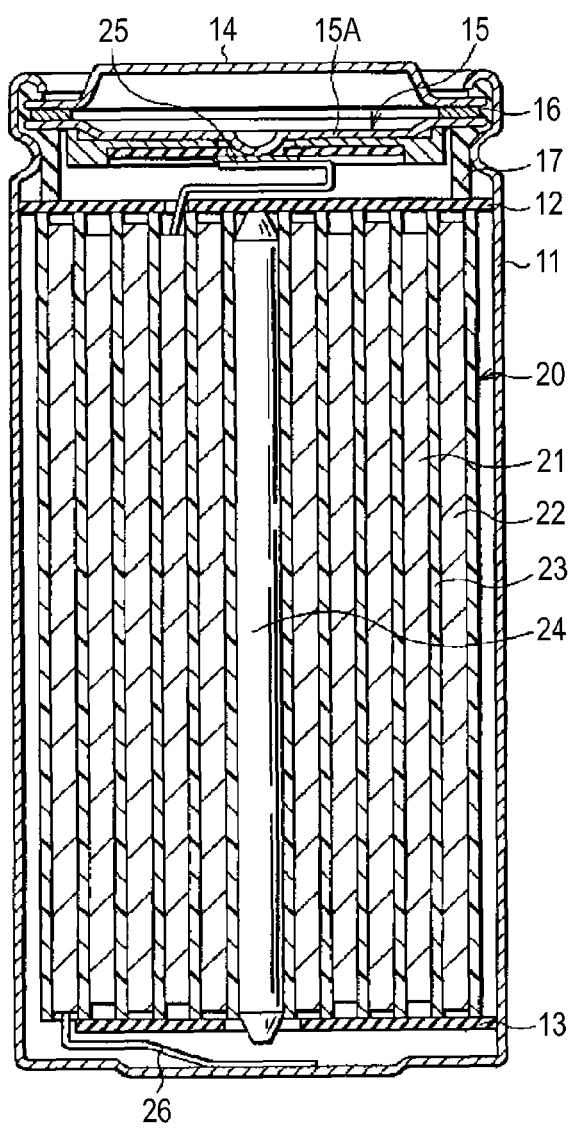
FIG. 1 is a sectional view illustrating a configuration of a secondary battery according to an embodiment of the present disclosure.

Embodiments according to the present disclosure are hereunder described by reference to the accompanying drawings. The description is made in the following order.

1. First embodiment (a configuration example of a positive electrode active material)

2. Second embodiment (an example of a cylinder type nonaqueous electrolyte battery using a positive electrode active material according to the present disclosure)

3. Third embodiment (an example of a laminated film type nonaqueous electrolyte battery using a positive electrode active material according to the present disclosure)

4. Fourth embodiment (an example of a coin type nonaqueous electrolyte battery using a positive electrode active material according to the present disclosure)

1. First Embodiment

In a first embodiment of the present disclosure, a constitution and a manufacturing method of a positive electrode active material are described.

(1-1) Constitution of Positive Electrode Active Material

A positive electrode active material according to the first embodiment of the present disclosure is a lithium complex oxide particle mainly composed of nickel (Ni) and containing cobalt (Co) together with nickel (Ni) as transition metals, and a concentration of cobalt (Co) is high on the particle surface. The positive electrode active material in which the concentration of cobalt (Co) is made high on the particle surface is able to inactivate the particle surface. According to the positive electrode active material according to the first embodiment of the present disclosure, by suppressing oxidation activity on the particle surface, decomposition of the non-aqueous electrolyte to be caused due to oxidation activity on the particle surface at an interface between the positive electrode active material and the nonaqueous electrolyte can be suppressed.

Specifically, the positive electrode active material according to the first embodiment of the present disclosure is composed of a lithium complex oxide particle having an average composition represented by the following formula (1).

$$Li_xCo_yNi_zM_{1-y-z}O_{b-a}X_a \qquad \text{Formula (1)}$$

In the formula (1), M represents at least one element selected from the group consisting of born (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb) and antimony (Sb); X represents a halogen atom; and x, y, z, a and b are values falling within the ranges of (0.8<x≤1.2), (0<y≤0.5), (0.5≤z≤1.0), (1.8≤b≤2.2) and (0≤a≤1.0), respectively.

The range of x is (0.80<x≤1.2), and preferably (0.95≤x≤1.07). When the value of x is smaller than the foregoing range, the discharge capacity is reduced; whereas when the value of x is larger than the foregoing range, stability of a crystal structure of the complex oxide particle is lowered, thereby causing a lowering of the capacity at the repetition of charge/discharge and a lowering of the safety. The range of y is (0<y≤0.50), preferably (0.15<y<0.30), and more preferably (0.15<y<0.25). When the value of y is smaller than the foregoing range, charge/discharge efficiency is lowered, thereby causing a lowering of the capacity at the repetition of charge/discharge and a lowering of the safety; whereas when the value of y is larger than the foregoing range, the discharge capacity is reduced.

The range of z is (0.50<z≤1.0), preferably (0.70<z<0.95), and more preferably (0.75≤z≤0.95). When the value of z is smaller than the foregoing range, the battery capacity is reduced; whereas when the value of z is larger than the foregoing range, a lowering of the capacity at the repetition of charge/discharge and a lowering of the safety are caused.

Then, in the lithium complex oxide particle according to the first embodiment of the present disclosure represented by the foregoing formula (1), when a jump amount of the XAFS spectrum between 7462.0 eV and 8462.0 eV obtained by the conversion electron yield method of the lithium complex oxide represented by the formula (1) is defined as μCo, and a jump amount of the XAFS spectrum between 8082.0 eV and 9130.0 eV obtained by the conversion electron yield method of the lithium complex oxide represented by the formula (1) is defined as μNi, μNi/μCo and z/y of the composition formula of the formula (1) are satisfied with a relation of the following expression (1).

$$\mu Ni/\mu Co < (z/y) + 0.425 \qquad \text{Expression (1)}$$

The XAFS spectrum is one obtained from the results measured regarding a region (depth: about 500 nm) in the vicinity of the particle surface, and μNi/μCo that is a ratio in the jump amount of the XAFS spectrum is a ratio in the existent amount between nickel (Ni) and cobalt (Co) on the surface of the positive electrode active material. Also, (z/y) is a ratio in the existent amount between nickel (Ni) and cobalt (Co) as a whole of the positive electrode active material. In consequence, when the foregoing expression (1) is satisfied, the existent amount of cobalt (Co) on the particle surface becomes large relative to the whole of the particle.

When μNi/μCo is {(z/y)+0.425} or more, the resultant is an active material in which the concentration of Co on the surface where electrochemical activity of nickel is low is low, high-temperature blister of the cell becomes large, and the capacity becomes small. In the positive electrode active material to which such a Co-surface treatment has been uniformly applied, oxidation activity of the positive electrode active material against the nonaqueous electrolyte and production of $Li_2CO_3$ can be suppressed.

Here, the X-ray absorption fine structure (XAFS) is described.

In general, each element has properties of absorbing X-rays with inherent energy to be caused due to electron transition of an inner-shell electron. That is, when an X-ray absorption spectrum of a certain element is measured, the absorption becomes abruptly large at certain energy or more. This is called an absorption edge. A fine structure in the vicinity of this absorption edge reflects the existent form of the subject element or its surrounding environment, and therefore, the analysis of the electron state or local structure is performed by analyzing this structure.

In particular, a structure obtained by subtracting a background from the absorption spectrum and enlarging a range of about several 10 eV extremely in the vicinity near the jump of the absorption edge is called an X-ray absorption near edge structure (XANES). The electron state of a central element is chiefly reflected in XANES. It is pointed out that even in $LiNiO_2$, following charge, the absorption edge is shifted to the high energy side (see, for example, *DENKI KAGAKU*, 66 (1998), 968, etc.).

Incidentally, it is preferable that the foregoing positive electrode active material forms a secondary particle obtained upon aggregation of a primary particle. By using the primary particle with a small average particle size, it is possible to solid-solve cobalt (Co) in the positive electrode active material and to suitably adjust a solid solution concentration of cobalt (Co) on the particle surface. Also, a diffusion rate of a lithium ion on the surface of the positive electrode active material is enhanced, and battery characteristics are enhanced. Also, by forming a secondary particle obtained upon aggregation of a primary particle, the amount of a binder necessary at the fabrication of an electrode can be reduced, and the formation of an active material layer becomes easy.

Here, when the positive electrode active material is in a state of a secondary particle obtained upon aggregation of a primary particle, the formula (1) that is an average composition of the positive electrode active material exhibits a composition as a whole of the positive electrode active material.

When the positive electrode active material forms a secondary particle obtained upon aggregation of a primary particle, it is preferable that in each primary particle forming a secondary particle, the concentration of cobalt (Co) in the vicinity of the surface of the primary particle is higher than the concentration of cobalt (Co) of the whole of the primary particle.

That is, in the lithium complex oxide particle according to the first embodiment of the present disclosure, which is represented by the foregoing formula (1), when a Co/Ni ratio on the topmost surface of the primary particle as measured by XPS is defined as Rt, and a Co/Ni ratio of the whole of the primary particle is defined as R, Rt and R are satisfied with a relation of the following expression (2).

$$1.5 < Rt/R < 35 \quad \text{Expression (2)}$$

When Rt/R is not more than 1.5, an effect for inhibiting a forming reaction of lithium carbonate by Co on the topmost surface of the particle or an effect for suppressing the generation of carbon dioxide by a reaction with an electrolytic solution is insufficient, and hence, such is not preferable. Also, when Rt/R is 35 or more, diffusion of Co into a crystal phase is insufficient, and a fine powder of the coated Co compound is incorporated, thereby causing a lowering of the capacity, and hence, such is not preferable.

In the positive electrode active material having Rt/R falling within the foregoing range, oxidation activity on the particle surface that is an interface of each primary particle with a nonaqueous electrolyte can be suppressed by cobalt (Co) on the particle surface. Also, in the positive electrode active material having Rt/R falling within the foregoing range, the matter that a fine powder of the coated cobalt (Co) compound is incorporated to cause a lowering of the battery capacity is prevented from occurring. In consequence, blister of the battery can be suppressed.

Incidentally, the Co/Ni ratio constituting Rt and R can be, for example, measured by the X-ray photoelectron spectroscopy (XPS).

Also, it is preferable that each primary particle forming a secondary particle is different in the Co/Ni composition within the particle, and the primary particle existing in the vicinity of the surface of the secondary particle is larger than the primary particle existing in the vicinity of the center of the secondary particle in terms of the existing amount of cobalt (Co).

That is, in the lithium complex oxide particle according to the first embodiment of the present disclosure, which is represented by the foregoing formula (1), when a Co/Ni ratio of the primary particle existing in the vicinity of the surface of the secondary particle is defined as Rs, and a Co/Ni ratio of the primary particle existing in the vicinity of the center of the secondary particle is defined as Ri, Rs and Ri are satisfied with a relation of the following formula (3).

$$1.05 < Rs/Ri < 25 \quad \text{Expression (3)}$$

In the positive electrode active material having Rs/Ri falling within the foregoing range, cobalt (Co) on the particle surface suppresses a forming reaction of lithium carbonate at the synthesis of the positive electrode active material, so that it becomes possible to prepare an active material with a small carbonic acid content. For that reason, a carbonic acid root of the positive electrode active material per se can be reduced, and the generation of a gas can be suppressed from the viewpoint different from the suppression of oxidation activity of the particle surface. Also, in the positive electrode active material having Rs/Ri falling within the foregoing range, diffusion of cobalt (Co) into a crystal phase sufficiently occurs, so that not only a strain is hardly generated in the crystal structure, but the matter that a fine powder of the coated cobalt (Co) compound is incorporated to cause a lowering of the battery capacity is prevented from occurring.

Incidentally, the Co/Ni ratio constituting Rs and Ri can be, for example, measured by the scanning electron microscope—energy dispersive X-ray spectrometry (SEM-EDX).

It is preferable that the foregoing expressions (2) and (3) are satisfied with at least one of the expressions (2) and (3) together with the requirement of the expression (1).

Here, in a usual lithium complex oxide mainly composed of nickel, in an XANES spectrum obtained by subtracting a linear background estimated in an absorption pre-edge region from an XAFS spectrum obtained between 7462.0 eV and 8462.0 eV and further normalizing in such a manner that an intensity of a secondary curve estimated in an absorption post-edge region is 1 over the whole region, cobalt K absorption edge energy at the time when its peak intensity is 0.5 is from about 7723.0 to 7723.8 eV.

On the other hand, in the positive electrode active material according to the first embodiment of the present disclosure, the cobalt K absorption edge energy at the time when its peak intensity is 0.5 is lowered by 1.0 eV or more as compared with that in the case of using a usual lithium complex oxide mainly composed of nickel. In general, the fact that the XANES spectrum is shifted to the low energy side means a lowering of the valence of the transition metal, and it is understood that the valence of the transition metal contained in the positive electrode active material according to the first embodiment of the present disclosure is lowered.

Also, in a usual lithium complex oxide mainly composed of nickel, in an XANES spectrum obtained by subtracting a linear background estimated in an absorption pre-edge region from an XAFS spectrum obtained between 8082.0 eV and 9130.0 eV and further normalizing in such a manner that an intensity of a secondary curve estimated in an absorption post-edge region is 1 over the whole region, nickel K absorption edge energy at the time when its peak intensity is 0.5 is from about 8344.0 to 8344.8 eV.

On the other hand, in the positive electrode active material according to the first embodiment of the present disclosure, the cobalt K absorption edge energy at the time when its peak intensity is 0.5 is lowered by 1.0 eV or more as compared with that in the case of using a usual lithium complex oxide mainly composed of nickel. In general, the fact that the XANES spectrum is shifted to the low energy side means a lowering of the valence of the transition metal, and it is understood that the valence of the transition metal contained in the positive electrode active material according to the first embodiment of the present disclosure is lowered.

In a positive electrode in a discharged state of from 2.5 V to 3.5 V (v.s. $Li/Li^+$) using the foregoing positive electrode active material, in an XANES spectrum obtained by subtracting a linear background estimated in an absorption pre-edge region from an XAFS spectrum obtained by the transmission method between 7462 eV and 8462 eV and further normalizing in such a manner that an intensity of a secondary curve estimated in an absorption post-edge region is 1 over the whole region, it is preferable that absorption edge energy at the time when its peak intensity is 0.5 lies on the energy side of 7722 eV or more and lower than 7723 eV.

When the absorption edge energy is not more than 7722 eV, cobalt (Co) is reduced to divalent, and a remarkable strain of the active material crystal structure or occupancy of an $Ni^{2+}$ ion in a lithium site is generated, and hence, such is not preferable. Also, when the absorption edge energy is 7723 eV or more, electrochemical activity of cobalt (Co) is lost, and the capacity is reduced. Hence, such is not preferable.

Also, in a positive electrode in a discharged state of from 2.5 V to 3.5 V (v.s. Li/Li$^+$) using the foregoing positive electrode active material, in an XANES spectrum obtained by subtracting a linear background estimated in an absorption pre-edge region from an XAFS spectrum obtained by the transmission method between 8082 eV and 9130 eV and further normalizing in such a manner that an intensity of a secondary curve estimated in an absorption post-edge region is 1 over the whole region, it is preferable that absorption edge energy at the time when its peak intensity is 0.5 lies on the energy side of 8342 eV or more and lower than 8344 eV.

When the absorption edge energy is not more than 8342 eV, nickel (Ni) is reduced to divalent, and a remarkable strain of the active material crystal structure or occupancy of an Ni$^{2+}$ ion in a lithium site is generated, and hence, such is not preferable. Also, when the absorption edge energy is 8344 eV or more, electrochemical activity of nickel (Ni) is lost, and the capacity is reduced. Hence, such is not preferable.

An average particle size of the positive electrode active material according to the first embodiment of the present disclosure, which has been subjected to surface modification so as to meet the foregoing requirements, is preferably in the range of 2.0 μm or more and not more than 50 μm. When the average particle size of the positive electrode active material is less than 2.0 μm, in the case of pressing at the fabrication of a positive electrode, the positive electrode active material layer is easily separated. Also, since the surface area of the positive electrode active material increases, it is inevitable to increase the addition amount of a conductive agent or a binder, and the energy density per unit weight tends to become small. On the other hand, when the average particle size of the positive electrode active material exceeds 50 μm, there is a concern that the particle penetrates into a separator, thereby causing a short circuit between the positive electrode and the negative electrode.

As raw materials for synthesizing the foregoing positive electrode active material according to the first embodiment of the present disclosure, the following materials are exemplified.

Examples of a raw material of the nickel compound include inorganic compounds such as nickel hydroxide, nickel carbonate, nickel nitrate, nickel fluoride, nickel chloride, nickel bromide, nickel iodide, nickel perchlorate, nickel bromate, nickel iodate, nickel oxide, nickel peroxide, nickel sulfide, nickel sulfate, nickel hydrogensulfate, nickel nitride, nickel nitrite, nickel phosphate and nickel thiocyanate; and organic compounds such as nickel oxalate and nickel acetate.

Examples of a raw material of the cobalt compound include inorganic compounds such as cobalt hydroxide, cobalt carbonate, cobalt nitrate, cobalt fluoride, cobalt chloride, cobalt bromide, cobalt iodide, cobalt chlorate, cobalt perchlorate, cobalt bromate, cobalt iodate, cobalt oxide, cobalt phosphinate, cobalt sulfide, cobalt hydrogensulfide, cobalt sulfate, cobalt hydrogensulfate, cobalt thiocyanate, cobalt nitrite, cobalt phosphate, cobalt dihydrogenphosphate and cobalt hydrogencarbonate; and organic compounds such as cobalt oxalate and cobalt acetate.

Examples of a raw material of the aluminum compound include inorganic compounds such as aluminum hydroxide, aluminum nitrate, aluminum fluoride, aluminum chloride, aluminum bromide, aluminum iodide, aluminum perchlorate, aluminum oxide, aluminum sulfide, aluminum sulfate and aluminum phosphate; and organic compounds such as aluminum oxalate.

Examples of a raw material of the lithium compound include inorganic compounds such as lithium hydroxide, lithium carbonate, lithium nitrate, lithium fluoride, lithium chloride, lithium bromide, lithium iodide, lithium chlorate, lithium perchlorate, lithium bromate, lithium iodate, lithium oxide, lithium peroxide, lithium sulfide, lithium hydrogensulfide, lithium sulfate, lithium hydrogensulfate, lithium nitride, lithium azide, lithium nitrite, lithium phosphate, lithium dihydrogenphosphate and lithium hydrogencarbonate; and organic compounds such as methyllithium, vinyllithium, isopropyllithium, butyllithium, phenyllithium, lithium oxalate and lithium acetate.

(1-2) Manufacturing Method of Positive Electrode Active Material

The positive electrode active material according to the first embodiment of the present disclosure is prepared in the following manner. Incidentally, the following manufacturing method is an example, and any method is adoptable so far as it is able to realize the foregoing constitution of a positive electrode active material.

[Preparation of Precursor]

First of all, a precursor containing, as transition metals, at least nickel (Ni) that is a main component of the transition metal as well as cobalt (Co) is prepared. For example, a nickel compound such as nickel sulfate and a cobalt compound such as cobalt sulfate are dissolved in water, and the solution is subjected to coprecipitation or the like while thoroughly stirring, thereby obtaining a nickel-cobalt complex coprecipitated hydroxide. At that time, a ratio of cobalt (Co) and nickel (Ni) in the coprecipitated hydroxide is adjusted depending upon a composition of the desired positive electrode active material. The nickel-cobalt complex coprecipitated hydroxide obtained by means of coprecipitation or the like is washed with water and dried, and a lithium compound such as lithium hydroxide is added to the nickel-cobalt complex coprecipitated hydroxide, thereby preparing a precursor.

Incidentally, in the case of allowing the transition metal to also include a transition metal M that is other element than cobalt (Co) and nickel (Ni), the precursor may be prepared by adding a compound containing the transition metal M together with the lithium compound.

[First Calcination]

The thus obtained precursor is calcined. A calcination temperature at the first calcination is preferably in the range of 450° C. or higher and not higher than 650° C. When the calcination temperature is lower than the foregoing range, diffusion of a lithium compound and an R3m layered crystal structure may not sufficiently occur. Also, when the calcination temperature is higher than the foregoing range, diffusion of a metal compound to be added in second calcination may not sufficiently occur. That is, the cobalt compound may be hardly solid-solved to the center of the secondary particle, whereby not only a lowering of the capacity to be caused due to the matter that large amounts of the metal compound and the lithium compound exist in the vicinity of the surface is caused, but the generation of a gas occurs very frequently.

Also, it is preferable that the calcination of the precursor is carried out in a stable atmosphere of oxygen or argon or the like. The precursor having been subjected to first calcination is, for example, in a state of a secondary particle obtained upon aggregation of a primary particle.

[Preparation of Intermediate]

To the precursor after the first calcination, an aqueous solution containing a cobalt compound is added. At that time, as to a condition of a dispersion liquid at the addition of a cobalt compound, its pH is preferably 10 or more and not more than 13. When the pH of the dispersion liquid is lower than 10, the lithium compound in the positive electrode active material having been subjected to first calcination is extracted, and furthermore, dissolution of the positive electrode active material starts to occur. When the pH of the dispersion liquid is higher than 13, an alkali which is used at the neutralization of the metal compound is easy to remain, thereby causing gelation at the preparation of an electrode mixture for the purpose of performing coating of an electrode. Also, the dispersion liquid at the addition of a metal compound has a relatively high pH, and furthermore, high-speed stirring is performed to achieve atomization of the formed metal compound particle, thereby bringing such an effect that crystal grain boundary diffusion into the positive electrode active material is easy to occur at performing second calcination. The pH is adjusted by, for example, adding sodium hydroxide and stirring the dispersion liquid for about one hour.

Subsequently, the precursor dispersed in the dispersion liquid is washed with ion-exchanged water or the like and then subjected to suction filtration, followed by drying. To the dried powder, a lithium compound is added, thereby preparing an intermediate.

Incidentally, in the case of allowing the transition metal to also include a transition metal M that is other element than cobalt (Co) and nickel (Ni), when a compound containing the transition metal M is not added at the preparation of a precursor, an intermediate may also be prepared by adding the compound containing a transition metal M together with the lithium compound.

[Second Calcination]

The thus obtained intermediate is calcined. A calcination temperature at the second calcination is preferably in the range of 700° C. or higher and not higher than 800° C. When the calcination temperature is lower than the foregoing range, crystallinity of the positive electrode active material is remarkably deteriorated, thereby causing cycle deterioration following charge/discharge, and the post-added metal compound is not sufficiently diffused, so that battery characteristics, namely blister at the high-temperature storage and a cycle characteristic are remarkably deteriorated. Also, when the calcination temperature is higher than the foregoing range, it is known that even in an oxygen atmosphere, the nickel atom intermingles into the lithium crystal layer, thereby causing a reduction of the capacity.

By using the thus prepared positive electrode active material, an exchange of an electron between nickel (Ni) and cobalt (Co) increases. Also, the valence increases at the discharge, so that the discharge capacity becomes large.

[Effect]

By using the positive electrode active material according to the first embodiment of the present disclosure, an exchange of an electron between nickel (Ni) and cobalt (Co) increases, so that a high discharge capacity is obtainable. Also, oxidation activity on the surface of the positive electrode active material is suppressed, and decomposition of the nonaqueous electrolyte is suppressed, thereby enabling one to suppress the generation of a gas. Incidentally, such a positive electrode is useful for any of a primary battery or a secondary battery.

2. Second Embodiment

In a second embodiment of the present disclosure, a cylinder type nonaqueous electrolyte battery using the positive electrode active material according to the first embodiment of the present disclosure is described.

(2-1) Configuration of Nonaqueous Electrolyte Battery

FIG. 1 illustrates a sectional structure of a nonaqueous electrolyte battery according to the second embodiment of the present disclosure. This nonaqueous electrolyte battery is a so-called lithium ion nonaqueous electrolyte battery using a positive electrode which uses the positive electrode active material according to the first embodiment of the present disclosure.

This nonaqueous electrolyte battery is of a so-called cylinder type and has a wound electrode body 20 having a pair of a strip-shaped positive electrode 21 and a strip-shaped negative electrode 22 wound via a separator 23 in the inside of a substantially hollow columnar battery can 11. The battery can 11 is, for example, constituted of nickel-plated iron, and one end thereof is closed, with the other end being opened. In the inside of the battery can 11, a pair of insulating plates 12 and 13 is respectively disposed vertical to the winding peripheral face so as to interpose the wound electrode body 20 therebetween.

In the open end of the battery can 11, a battery lid 14 is installed by caulking with a safety valve mechanism 15 and a positive temperature coefficient device (PTC device) 16 provided in the inside of this battery lid 14 via a gasket 17, and the inside of the battery can 11 is hermetically sealed. The battery lid 14 is, for example, constituted of the same material as that in the battery can 11. The safety valve mechanism 15 is electrically connected to the battery lid 14 via the positive temperature coefficient device 16. In this safety valve mechanism 15, when the internal pressure of the battery reaches a fixed value or more due to an internal short circuit or heating from the outside or the like, a disc plate 15A is reversed, whereby electrical connection between the battery lid 14 and the wound electrode body 20 is disconnected. When the temperature increases, the positive temperature coefficient device 16 controls the current by an increase of the resistance value, thereby preventing abnormal heat generation to be caused due to a large current from occurring. The gasket 17 is, for example, constituted of an insulating material, and asphalt is coated on the surface thereof.

For example, a center pin 24 is inserted on the center of the wound electrode body 20. In the wound electrode body 20, a positive electrode lead 25 made of aluminum or the like is connected to the positive electrode 21; and a negative electrode lead 26 made of nickel or the like is connected to the negative electrode 22. The positive electrode lead 25 is electrically connected to the battery lid 14 by means of welding to the safety valve mechanism 15; and the negative electrode lead 26 is electrically connected to the battery can 11 by means of welding.

Figure 2:
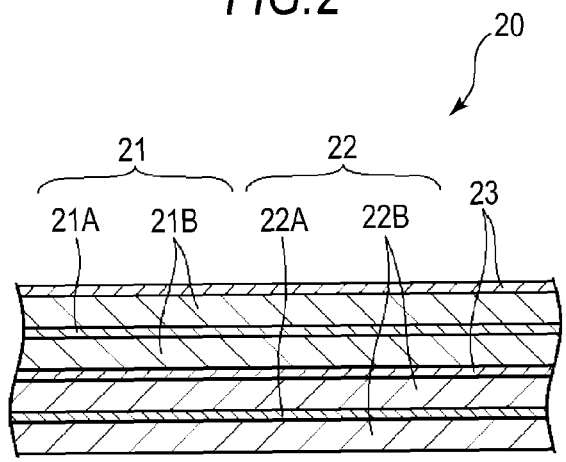
FIG. 2 is a sectional view illustrating enlargedly a part of a wound electrode body of the secondary battery shown in FIG. 1.

FIG. 2 illustrates enlargedly a part of the wound electrode body 20 shown in FIG. 1. In the second embodiment of the present disclosure, the same positive electrode active material as that in the first embodiment of the present disclosure can be used. The positive electrode 21, the negative electrode 22 and the separator 23 are hereunder described in detail.

[Positive Electrode]

The positive electrode 21 has, for example, a structure in which a positive electrode active material layer 21B is provided on the both surfaces of a positive electrode collector 21A having a pair of surfaces opposing to each other. While illustration is omitted, the positive electrode active material layer 21B may be provided on only one surface of the positive electrode collector 21A. The positive electrode collector 21A is, for example, constituted of a metal foil such as an aluminum foil.

In the positive electrode active material layer 21B, the lithium complex oxide particle disclosed in the first embodiment of the present disclosure can be used as the positive electrode active material. As to the positive electrode active material layer 21B, a positive electrode active material, a conductive agent and a binder are mixed to prepare a positive electrode mixture, and this positive electrode mixture is dispersed in a solvent such as N-methyl-2-pyrrolidone to prepare a positive electrode mixture slurry in a paste form. Subsequently, this positive electrode mixture slurry is coated on the positive electrode collector 21A, and the solvent is dried. The resultant is compression molded by a roll press or the like to form the positive electrode active material layer 21B. There is thus formed the positive electrode 21.

[Negative Electrode]

The negative electrode 22 has, for example, a structure in which a negative electrode active material layer 22B is provided on the both surfaces of a negative electrode collector 22A having a pair of surfaces opposing to each other. While illustration is omitted, the negative electrode active material layer 22B may be provided on only one surface of the negative electrode collector 22A. The negative electrode collector 22A is, for example, constituted of a metal foil such as a copper foil.

The negative electrode active material layer 22B is constituted so as to contain, as a negative electrode active material, one or two or more kinds of a negative electrode material capable of intercalating and deintercalating lithium and further contain the same binder as that in the positive electrode active material layer 21B, if desired.

Incidentally, in this nonaqueous electrolyte battery, an electrochemical equivalent of the negative electrode material capable of intercalating and deintercalating lithium is larger than an electrochemical equivalent of the positive electrode 21, and a lithium metal does not theoretically deposit on the negative electrode 22 on the way of charge.

Also, this nonaqueous electrolyte battery is designed in such a manner that an open circuit voltage (namely, a battery voltage) in a completely charged state falls within the range of, for example, 4.20 V or more and not more than 6.00 V. Also, for example, it is preferable that the open circuit voltage in a fully charged state is 4.25 V or more and not more than 6.00 V. When the open circuit voltage in a fully charged state is 4.25 V or more, in comparison with a 4.20-V battery, even when the same positive electrode active material is concerned, a deintercalation amount of lithium per unit mass is large, and therefore, the amounts of the positive electrode active material and the negative electrode active material are regulated in response thereto. According to this, a high energy density is obtainable.

Examples of the negative electrode material capable of intercalating and deintercalating lithium include carbon materials such as hardly graphitized carbon, easily graphitized carbon, graphite, pyrolytic carbons, cokes, vitreous carbons, organic polymer compound calcined materials, carbon fibers and active carbon. Of these, examples of the cokes include pitch coke, needle coke and petroleum coke. The organic polymer compound calcined material as referred to herein is a material obtained through carbonization by calcining a polymer material such as phenol resins and furan resins at an appropriate temperature, and a part thereof is classified into hardly graphitized carbon or easily graphitized carbon. Such a carbon material is preferable because a change in the crystal structure to be generated at the time of charge/discharge is very small, a high charge/discharge capacity is obtainable, and a favorable cycle characteristic is obtainable. In particular, graphite is preferable because its electrochemical equivalent is large, and a high energy density is obtainable. Also, hardly graphitized carbon is preferable because an excellent cycle characteristic is obtainable. Moreover, a material having a low charge/discharge potential, specifically one having a charge/discharge potential close to a lithium metal, is preferable because a high energy density of the battery can be easily realized.

Examples of the negative electrode material capable of intercalating and deintercalating lithium also include a material capable of intercalating and deintercalating lithium and containing, as a constituent element, at least one member selected from the group consisting of metal elements and semi-metal elements. This is because by using such a material, a high energy density is obtainable. In particular, the joint use of such a material with the carbon material is more preferable because not only a high energy density is obtainable, but an excellent cycle characteristic is obtainable. This negative electrode material may be a simple substance, an alloy or a compound of a metal element or a semi-metal element. Also, the negative electrode material may be an electrode material having one or two or more kinds of such a phase in at least apart thereof. Incidentally, in the second embodiment of the present disclosure, the alloy includes alloys containing at least one metal element and at least one semi-metal element in addition to alloys composed of two or more metal elements. Also, the negative electrode material may contain a non-metal element. Examples of its texture include a solid solution, a eutectic (eutectic mixture), an intermetallic compound and one in which two or more thereof coexist.

Examples of the metal element or semi-metal element which constitutes this negative electrode material include magnesium, boron, aluminum, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd) and platinum (Pt). These may be crystalline or amorphous.

Of these, ones containing, as a constituent element, a metal element or a semi-metal element belonging to the Group 4B in the short form of the periodic table are preferable, and ones containing, as a constituent element, at least one of silicon and tin are especially preferable as this negative electrode material. This is because silicon and tin have large capability of intercalating and deintercalating lithium, and a high energy density is obtainable.

Examples of alloys of tin include alloys containing, as a second constituent element other than tin, at least one member selected from the group consisting of silicon, nickel, copper, iron, cobalt, manganese, zinc, indium, silver, titanium (Ti), germanium, bismuth, antimony (Sb) and chromium. Examples of alloys of silicon include alloys containing, as a second constituent element other than silicon, at least one member selected from the group consisting of tin, nickel, copper, iron, cobalt, manganese, zinc, indium, silver, titanium, germanium, bismuth, antimony and chromium.

Examples of compounds of tin or compounds of silicon include compounds containing oxygen (O) or carbon (C), and these compounds may contain the foregoing second constituent element in addition to tin or silicon.

Of these, CoSnC-containing materials containing tin, cobalt and carbon as constituent elements and having a content of carbon of 9.9%. by mass or more and not more than 29.7%. by mass and a proportion of cobalt of 30%. by mass or more and not more than 70%. by mass relative to the total sum of tin and cobalt are preferable as this negative electrode material. This is because in the foregoing composition range, not only a high energy density is obtainable, but an excellent cycle characteristic is obtainable.

This CoSnC-containing material may further contain other constituent element, if desired. As such other constituent element, for example, silicon, iron, nickel, chromium, indium, niobium (Nb), germanium, titanium, molybdenum (Mo), aluminum, phosphorus (P), gallium (Ga) or bismuth is preferable, and two or more kinds of these elements may be contained. This is because the capacity or cycle characteristic can be more enhanced.

Incidentally, this CoSnC-containing material has a phase containing tin, cobalt and carbon, and it is preferable that this phase has a low crystalline or amorphous structure. Also, in this CoSnC-containing material, it is preferable that at least a part of carbon that is the constituent element is bound to the metal element or semi-metal element that is other constituent element. This is because though it may be considered that a lowering of the cycle characteristic is caused due to aggregation or crystallization of tin or the like, when carbon is bound to other element, such aggregation or crystallization can be suppressed.

Examples of a measurement method for examining the binding state of elements include X-ray photoelectron spectroscopy (XPS). In this XPS, so far as graphite is concerned, a peak of the is orbit (C1s) of carbon appears at 284.5 eV in an energy-calibrated apparatus such that a peak of the 4f orbit of a gold atom (Au4f) is obtained at 84.0 eV. Also, so far as surface contamination carbon is concerned, a peak of the 1s orbit (C1s) of carbon appears at 284.8 eV. On the contrary, when a charge density of the carbon element is high, for example, when carbon is bound to a metal element or a semi-metal element, the peak of C1s appears in a lower region than 284.5 eV. That is, when a peak of a combined wave of C1s obtained regarding the CoSnC-containing material appears in a lower region than 284.5 eV, at least apart of carbon contained in the CoSnC-containing material is bound to a metal element or a semi-metal element as other constituent element.

Incidentally, in the XPS measurement, for example, the peak of C1s is used for correcting the energy axis of a spectrum. In general, since surface contamination carbon exists on the surface, the peak of C1s of the surface contamination carbon is fixed at 284.8 eV, and this peak is used as an energy reference. In the XPS measurement, since a waveform of the peak of C1s is obtained as a form including the peak of the surface contamination carbon and the peak of carbon in the CoSnC-containing material, the peak of the surface contamination carbon and the peak of the carbon in the CoSnC-containing material are separated from each other by means of analysis using, for example, a commercially available software program. In the analysis of the waveform, the position of a main peak existing on the lowest binding energy side is used as an energy reference (284.8 eV).

The negative electrode active material layer 22B may further contain other negative electrode active material. Also, the negative electrode active material layer 22B may contain other material which does not contribute to the charge, such as a conductive agent, a binder and a viscosity modifier. Examples of other negative electrode active material include carbon materials such as natural graphite, artificial graphite, hardly graphitized carbon and easily graphitized carbon. Examples of the conductive agent include a graphite fiber, a metal fiber and a metal powder. Examples of the binder include fluorocarbon based polymer compounds such as polyvinylidene fluoride; and synthetic rubbers such as a styrene-butadiene rubber and an ethylene-propylene-diene rubber. Examples of the viscosity modifier include carboxymethyl cellulose.

Furthermore, a porous insulating layer containing an insulating metal oxide may be disposed on the negative electrode active material layer 22B. It is preferable that the porous insulating layer contains an insulating metal oxide and a binder. It is preferable that the insulating metal oxide includes at least one member selected from the group consisting of alumina, silica, magnesia, titania and zirconia.

It is preferable that the binder includes at least one member selected from the group consisting of polyvinylidene fluoride (PVdF), polytetrafluoroethylene (PTFE), polyacrylonitrile (PAN), a styrene-butadiene rubber (SBR) and carboxymethyl cellulose (CMC).

[Separator]

The separator 23 partitions the positive electrode 21 and the negative electrode 22 from each other and allows a lithium ion to pass therethrough while preventing a short circuit of the current to be caused due to the contact of the both electrodes from occurring. The separator 23 is, for example, constituted of a porous film made of a synthetic resin such as polytetrafluoroethylene, polypropylene and polyethylene; or a porous film made of a ceramic. The separator 23 may have a structure in which two or more kinds of such a porous film are laminated.

The separator 23 is impregnated with an electrolytic solution that is a liquid electrolyte. This electrolytic solution contains a solvent and an electrolyte salt dissolved in this solvent.

The separator 23 is constituted so as to contain anyone of polypropylene (PP), polyvinylidene fluoride (PVdF), polytetrafluoroethylene (PTFE), aluminum oxide ($Al_2O_3$) or silicon oxide ($SiO_2$) other than polyethylene. Also, the separator 23 may be constituted of a porous film made of a ceramic, and a mixture of several kinds among polyethylene (PE), polypropylene (PP) and polytetrafluoroethylene (PTFE) may be used as a porous film. Furthermore, polyvinylidene fluoride (PVdF), aluminum oxide ($Al_2O_3$) or silicon oxide ($SiO_2$) may be coated on the surface of a porous film made of polyethylene (PE), polypropylene (PP) or polytetrafluoroethylene (PTFE). Also, a structure in which two or more kinds of a porous film of polyethylene (PE), polypropylene (PP) or polytetrafluoroethylene (PTFE) are laminated may be used. A porous film made of a polyolefin is preferable because it is excellent in an effect for preventing a short circuit from occurring and is able to contrive to enhance the safety of a battery due to a shutdown effect.

[Nonaqueous Electrolyte]

The nonaqueous electrolyte contains an electrolyte salt and a nonaqueous solvent capable of dissolving this electrolyte salt therein.

For example, the electrolyte salt contains one or two or more kinds of a light metal compound such as a lithium salt. Examples of this lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr). Above all, at least one member selected from the group consisting of lithium hexafluorophosphate, lithium tetrafluoroborate, lithium perchlorate and lithium hexafluoroarsenate is preferable, and lithium hexafluorophosphate is more preferable. This is because the resistance of the electrolyte layer is lowered.

Examples of the solvent include nonaqueous solvents, for example, lactone based solvents such as γ-butyrolactone, γ-valerolactone, δ-valerolactone and ε-caprolactone; carbonate based solvents such as ethylene carbonate, propylene carbonate, butylene carbonate, vinylene carbonate, dimethyl carbonate, ethyl methyl carbonate and diethyl carbonate; ether based solvents such as 1,2-dimethoxyethane, 1-ethoxy-2-methoxyethane, 1,2-diethoxyethane, tetrahydrofuran and 2-methyltetrahydrofuran; nitrile based solvents such as acetonitrile; sulfolane based solvents; phosphoric acids; phosphate solvents; and pyrrolidones. The solvent may be used singly or in admixture of two or more kinds thereof.

Also, it is preferable that a cyclic carbonate or a chain carbonate is used as the nonaqueous solvent; and it is more preferable that the nonaqueous solvent contains a compound obtained by fluorinating a part or all of hydrogens of a cyclic carbonate or a chain carbonate. As such a fluorinated compound, it is preferable to use fluoroethylene carbonate (4-fluoro-1,3-dixolan-2-one) or difluoroethylene carbonate (4,5-difluoro-1,3-dioxolan-2-one). This is because even when the negative electrode 22 containing, as a negative electrode active material, a compound of silicon (Si), tin (Sn), germanium (Ge) or the like is used, a charge/discharge cycle characteristic can be enhanced, and in particular, difluoroethylene carbonate is excellent in an effect for improving the cycle characteristic.

It is preferable that 0.01% by weight or more and not more than 30% by weight of a halogen atom-containing cyclic carbonate derivative is contained in the nonaqueous electrolyte.

(2-2) Manufacturing Method of Nonaqueous Electrolyte Battery:

[Manufacturing Method of Positive Electrode]

The positive electrode can be fabricated in the same manner as that in the first embodiment of the present disclosure.

[Manufacturing Method of Negative Electrode]

A negative electrode active material and a binder are mixed to prepare a negative electrode mixture, and this negative electrode mixture is dispersed in a solvent such as N-methyl-2-pyrrolidone, thereby preparing a negative electrode mixture slurry in a paste form. Subsequently, this negative electrode mixture slurry is coated on the negative electrode collector 22A, and the solvent is dried. The resultant is compression molded by a roll press or the like to form the negative electrode active material layer 22B. There is thus fabricated the negative electrode 22.

[Preparation of Nonaqueous Electrolyte]

The nonaqueous electrolyte is prepared by mixing a nonaqueous solvent and an electrolyte salt.

[Assembling of Nonaqueous Electrolyte Battery]

The positive electrode lead 25 is installed in the positive electrode collector 21A by means of welding or the like, and the negative electrode lead 26 is also installed in the negative electrode collector 22A by means of welding or the like. Thereafter, the positive electrode 21 and the negative electrode 22 are wound via the separator 23; a tip end of the positive electrode lead 25 is welded to the safety valve mechanism 15; a tip end of the negative electrode lead 26 is also welded to the battery can 11; and the wound positive electrode 21 and negative electrode 22 are interposed between a pair of the insulating plates 12 and 13 and housed in the inside of the battery can 11. After housing the positive electrode 21 and the negative electrode 22 in the inside of the battery can 11, the electrolytic solution is injected into the inside of the battery can 11 and impregnated in the separator 23. Thereafter, the battery lid 14, the safety valve mechanism 15 and the positive temperature coefficient device 16 are fixed to the open end of the battery can 11 upon being caulked via the gasket 17. According to this, there is formed the nonaqueous electrolyte battery shown in FIG. 1.

In this nonaqueous electrolyte battery, when charged, for example, a lithium ion is deintercalated from the positive electrode active material layer 21B and intercalated in the negative electrode active material layer 22B via the nonaqueous electrolyte. Also, when discharged, for example, a lithium ion is deintercalated from the negative electrode active material layer 22B and intercalated in the positive electrode active material layer 21B via the nonaqueous electrolyte.

[Effect]

According to the second embodiment of the present disclosure, the battery capacity can be enhanced. Also, the generation of a gas in the inside of the battery is suppressed, thereby enabling one to suppress an increase of the internal pressure of the battery.

3. Third Embodiment

In a third embodiment of the present disclosure, a laminated film type nonaqueous electrolyte battery using the positive electrode active material according to the first embodiment of the present disclosure is described.

(3-1) Configuration of Nonaqueous Electrolyte Battery

Figure 3:
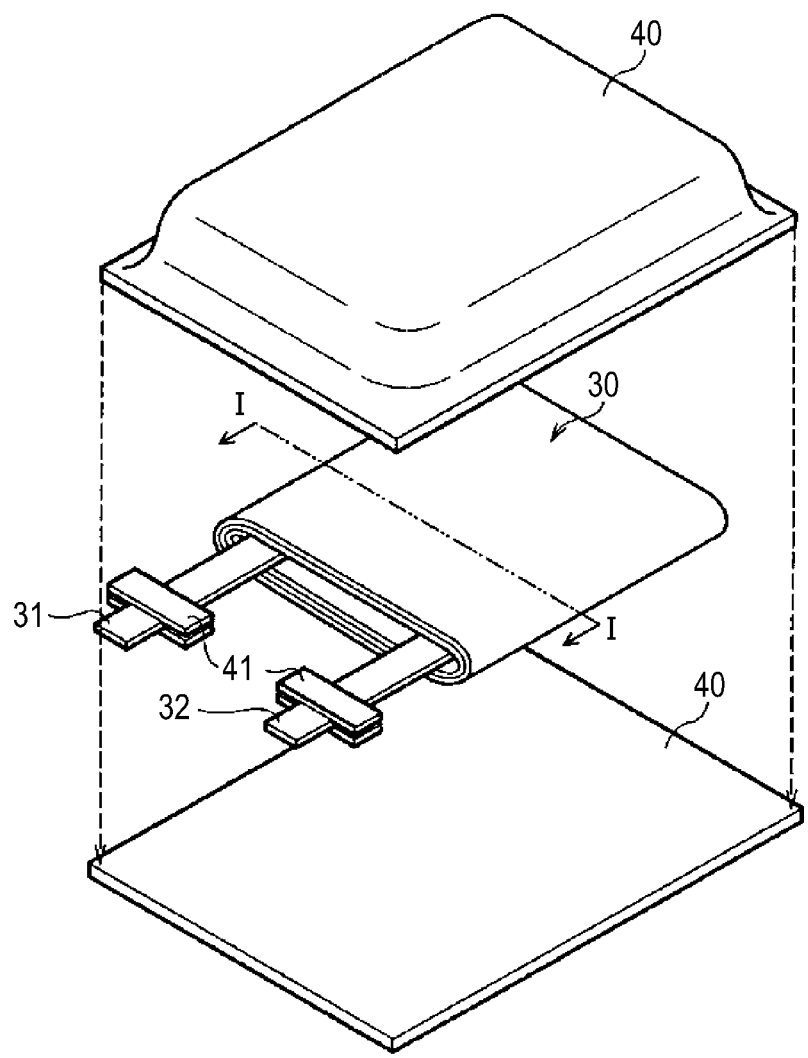
FIG. 3 is an exploded perspective view illustrating a configuration of a secondary battery according to a second embodiment of the present disclosure.

FIG. 3 shows a configuration of a nonaqueous electrolyte battery according to the third embodiment of the present disclosure. This nonaqueous electrolyte battery is of a so-called laminated film type and is one in which the wound electrode body 30 having a positive electrode lead 31 and a negative electrode lead 32 installed therein is housed in the inside of a film-shaped package member 40.

The positive electrode lead 31 and the negative electrode lead 32 are each led out in, for example, the same direction from the inside of the package member 40 toward the outside thereof. Each of the positive electrode lead 31 and the negative electrode lead 32 is, for example, constituted of a metal material such as aluminum, copper, nickel and stainless steel and formed in a thin plate state or a network state.

The package member 40 is, for example, constituted of a rectangular aluminum laminated film obtained by sticking a nylon film, an aluminum foil and a polyethylene film in this order. In the package member 40, for example, the side of the polyethylene film is disposed so as to be opposed to the wound electrode body 30, and the respective outer edges thereof are brought into intimate contact with each other by means of fusion or with an adhesive. A contact film 41 is inserted between the package member 40 and each of the positive electrode lead 31 and the negative electrode lead 32 for the purpose of preventing invasion of the outside air from occurring. The contact film 41 is constituted of a material having adhesion to each of the positive electrode lead 31 and the negative electrode lead 32, for example, polyolefin resins such as polyethylene, polypropylene, modified polyethylene and modified polypropylene.

Incidentally, the package member 40 may be constituted of a laminated film having other structure, a polymer film such as polypropylene or a metal film in place of the foregoing aluminum laminated film.

Figure 4:
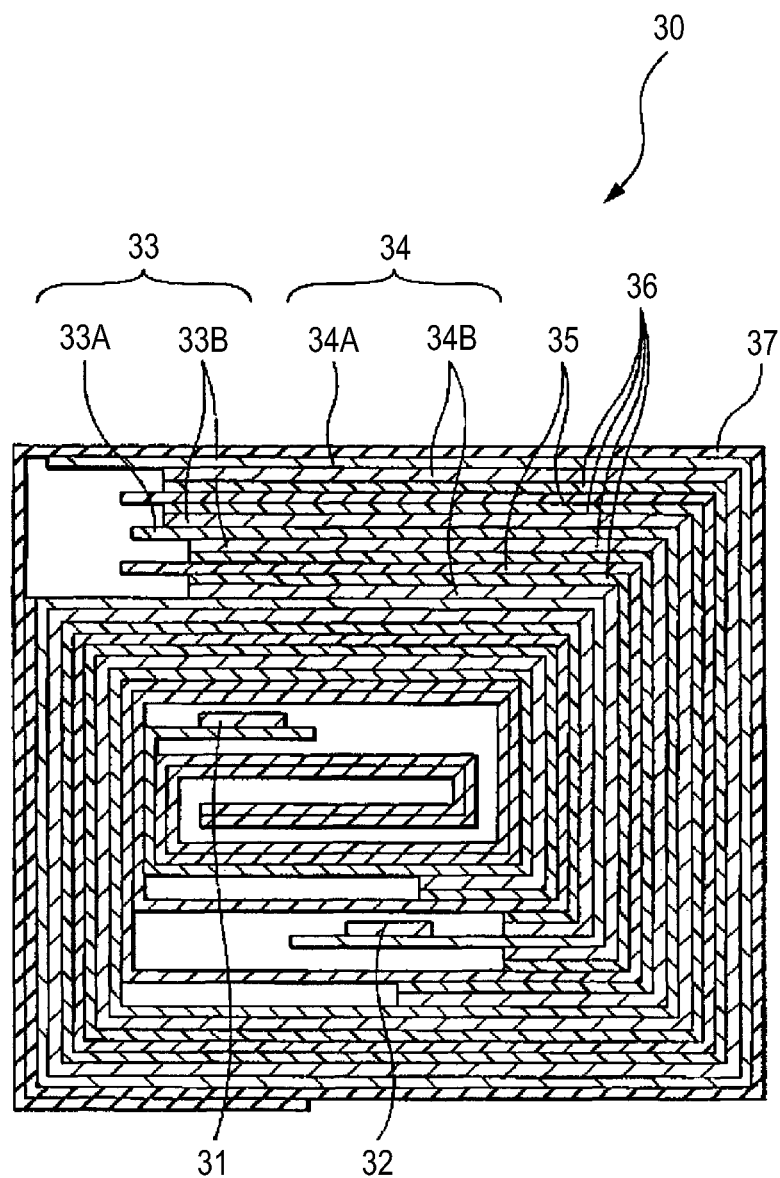
FIG. 4 is a sectional view illustrating a configuration along an I-I line of a wound electrode body shown in FIG. 3.

FIG. 4 illustrates a sectional structure along an I-I line of the wound electrode body 30 shown in FIG. 3. The wound electrode body 30 is one prepared by laminating a positive electrode 33 and a negative electrode 34 via a separator 35 and an electrolyte layer 36 and winding the laminate, and an outermost peripheral part thereof is protected by a protective tape 37.

[Positive Electrode]

The positive electrode 33 has a structure in which a positive electrode active material layer 33B is provided on one surface or both surfaces of a positive electrode collector 33A, and a positive electrode containing the same positive electrode active material as that in the first embodiment of the present disclosure and having the same configuration as that in the second embodiment of the present disclosure can be used.

[Negative Electrode]

The negative electrode 34 has a structure in which a negative electrode active material layer 34B is provided on one surface or both surfaces of a negative electrode collector 34A, and the negative electrode active material layer 34B and the positive electrode active material layer 33B are disposed opposing to each other. The configuration of each of the negative electrode collector 34A and the negative electrode active material layer 34B is the same as the configuration of each of the negative electrode collector 22A and the negative electrode active material layer 22B in the foregoing second embodiment of the present disclosure.

[Separator]

The separator 35 is the same as the separator 23 according to the second embodiment of the present disclosure.

[Nonaqueous Electrolyte]

The electrolyte layer 36 is the nonaqueous electrolyte according to the third embodiment of the present disclosure, contains a nonaqueous electrolytic solution and a polymer compound serving as a holding material for holding the nonaqueous electrolytic solution therein and is formed in a so-called gel form. The electrolyte in a gel form is preferable because not only a high ion conductivity is obtainable, but the liquid leakage of the battery can be prevented from occurring.

Examples of the polymer material include ether based polymer compounds such as polyethylene oxide and a crosslinked material containing polyethylene oxide; ester based polymer compounds such as polymethacrylates; acrylate based polymer compounds; and polymers of vinylidene fluoride such as polyvinylidene fluoride and a copolymer of vinylidene fluoride and hexafluoropropylene. These compounds may be used singly or in admixture of two or more kinds thereof. In particular, from the viewpoint of oxidation-reduction stability, it is desirable to use a fluorocarbon based polymer compound such as polymers of vinylidene fluoride.

(3-2)

This nonaqueous electrolyte battery can be, for example, manufactured in the following manner.

[Manufacturing Method of Positive Electrode and Negative Electrode]

Each of the positive electrode 33 and the negative electrode 34 can be fabricated in the same method as that in the second embodiment of the present disclosure.

[Assembling of Nonaqueous Electrolyte Battery]

A precursor solution containing a nonaqueous electrolytic solution, a polymer compound and a mixed solvent is coated on each of the positive electrode 33 and the negative electrode 34, and the mixed solvent is then vaporized to form the electrolyte layer 36. Thereafter, the positive electrode lead 31 is installed in an end of the positive electrode collector 33A by means of welding, and the negative electrode lead 32 is also installed in an end of the negative electrode collector 34A by means of welding.

Subsequently, the positive electrode 33 and the negative electrode 34 each provided with the electrolyte layer 36 are laminated via the separator 35 to formalaminate, the laminate is then wound in the longitudinal direction thereof, and the protective tape 37 is allowed to adhere to the outermost peripheral part to form the wound electrode body 30. Finally, for example, the wound electrode body 30 is interposed between the package members 40, and the outer edges of the package members 40 are brought into intimate contact with each other by means of heat fusion or the like, thereby sealing the wound electrode body 30. On that occasion, the contact film 41 is inserted between each of the positive electrode lead 31 and the negative electrode lead 32 and the package member 40. According to this, the nonaqueous electrolyte battery shown in FIGS. 3 and 4 is completed.

Also, this nonaqueous electrolyte battery may be fabricated in the following manner. First of all, the positive electrode 33 and the negative electrode 34 are prepared in the foregoing manner; the positive electrode lead 31 and the negative electrode lead 32 are installed in the positive electrode 33 and the negative electrode 34, respectively; the positive electrode 33 and the negative electrode 34 are then laminated via the separator 35 and wound; and the protective tape 37 is allowed to adhere to the outermost peripheral part to form a wound body that is a precursor of the wound electrode body 30. Subsequently, this wound body is interposed between the package members 40, and the outer edges exclusive of one side are subjected to heat fusion to form a bag and then housed in the inside of the package member 40. Subsequently, a composition for electrolyte containing an electrolytic solution, a monomer that is a raw material of the polymer compound, a polymerization initiator and optionally, other material such as a polymerization inhibitor is prepared and injected into the inside of the package member 40.

After injecting the composition for electrolyte, an opening of the package member 40 is hermetically sealed by means of heat fusion in a vacuum atmosphere. Subsequently, the monomer is polymerized upon heating to form a polymer compound, thereby forming the electrolyte layer 36 in a gel form. There is thus assembled the nonaqueous electrolyte battery shown in FIGS. 3 and 4.

[Effect]

The actions and effects of this secondary battery are the same as those in the foregoing first and second embodiments of the present disclosure.

4. Fourth Embodiment

In a fourth embodiment of the present disclosure, a coin type nonaqueous electrolyte battery using the positive electrode active material according to the first embodiment of the present disclosure is described.

(4-1) Configuration of Nonaqueous Electrolyte Battery

Figure 5:
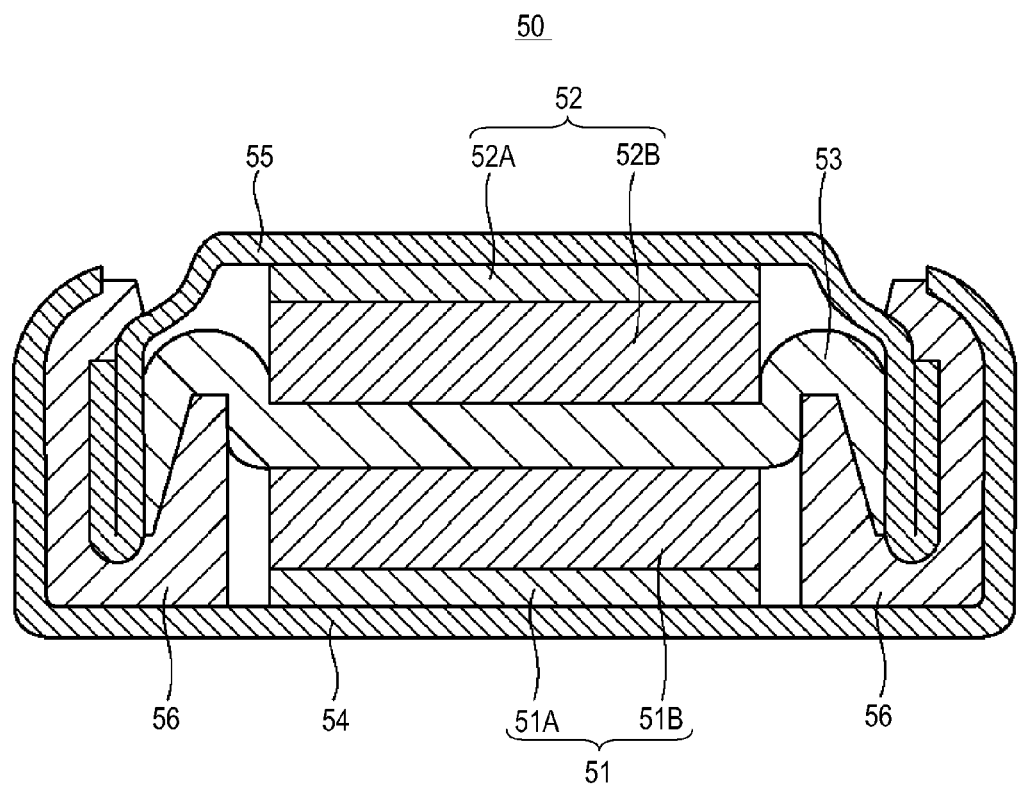
FIG. 5 is a sectional view illustrating a configuration of a secondary battery according to a fourth embodiment of the present disclosure.

FIG. 5 illustrates a sectional structure of a nonaqueous electrolyte battery according to the fourth embodiment of the present disclosure. This nonaqueous electrolyte battery is a so-called lithium ion nonaqueous electrolyte battery using a positive electrode which uses the positive electrode active material according to the first embodiment of the present disclosure.

This nonaqueous electrolyte battery 50 is of a so-called coin type and is one in which a disc-shaped positive electrode 51 housed in a positive electrode can 54 and a disc-shaped negative electrode 52 housed in a negative electrode can 55 are laminated via a separator 53. The separator 53 is impregnated with a nonaqueous electrolytic solution that is an electrolyte in a liquid form, and the respective outer edges of the positive electrode can 54 and the negative electrode can 55 are hermetically sealed upon being caulked via a gasket 56. The gasket 56 is one for preventing the liquid leakage of the nonaqueous electrolytic solution filled in each of the positive electrode can 54 and the negative electrode can 55 from occurring and is incorporated into and integrated with the negative electrode can 55. Also, in the case where a solid electrolyte or a gel electrolyte is used together with or in place of the nonaqueous electrolytic solution, a solid electrolytic layer or a gel electrolyte layer is formed on each of the positive electrode 51 and the negative electrode 52.

[Package Can]

Each of the positive electrode can 54 and the negative electrode can 55 is, for example, constituted of a metal such as stainless steel and aluminum (Al). The positive electrode can 54 is one for housing the positive electrode 51 therein and also functions as an external terminal on the positive electrode side of the nonaqueous electrolyte battery 50. The negative electrode can 55 is one for housing the negative electrode 52 therein and also functions as an external terminal on the negative electrode side of the nonaqueous electrolyte battery 50.

[Positive Electrode]

For example, the positive electrode 51 has a positive electrode collector 51A and a positive electrode active material 51B provided on the positive electrode collector 51A. The positive electrode collector 51A is, for example, constituted of a metal foil such as an aluminum (Al) foil. As the positive electrode active material which is contained in the positive electrode active material layer 51B, the positive electrode active material according to the first embodiment of the present disclosure can be used. Also, in the positive electrode 51, the same configuration as that in the second embodiment of the present disclosure can be taken, except for the matter that the shape is circular.

[Negative Electrode]

For example, the negative electrode 52 has a negative electrode collector 52A and a negative electrode active material layer 52B provided on the negative electrode collector 52A. The negative electrode collector 52A is, for example, constituted of a metal foil such as a copper (Cu) foil. In the negative electrode 52, the same configuration as that in the second embodiment of the present disclosure can be taken, except for the matter that the shape is circular.

(4-2) Assembling of Nonaqueous Electrolyte Battery

Subsequently, the negative electrode 52 and the separator 53 are housed in this order in the center of the negative electrode can 55, and an electrolytic solution is injected from the top of the separator 53. Subsequently, the positive electrode can 54 having the positive electrode 51 housed therein is covered on the negative electrode can 55 and caulked via the gasket 56, thereby fixing the positive electrode can 54 and the negative electrode can 55 to each other. There is thus formed the nonaqueous electrolyte battery 50 shown in FIG. 5.

[Effect]

The actions and effects of this secondary battery are the same as those in the foregoing first to third embodiments of the present disclosure.

EXAMPLES

Example 1

[Fabrication of Positive Electrode]

Nickel sulfate ($NiSO_4$) and cobalt sulfate ($CoSO_4$) were dissolved in water, and a sodium hydroxide (NaOH) solution was added while thoroughly stirring, thereby obtaining a nickel-cobalt complex coprecipitated hydroxide having a molar ratio of Ni to Co of 85/15. The produced coprecipitate was washed with water and dried, and thereafter, lithium hydroxide monohydrate ($LiOH.H_2O$) and aluminum hydroxide ($Al(OH)_3$) were added so as to adjust a molar ratio of Li/(Ni+Co+Al) at 103/100. There was thus obtained a precursor.

Subsequently, the precursor was calcined in an oxygen gas stream at 500° C. for 10 hours. This 500° C.-calcined powder was taken out, pulverized and then dispersed in 100 g of ion-exchanged water. 32 mL of a 2.0 moles/L cobalt nitrate aqueous solution was added, sodium hydroxide was added such that a pH of the dispersion liquid was 12, and the mixture was stirred for one hour. Furthermore, the calcined powder was washed with 1 L of ion-exchanged water and subjected to suction filtration, and the resultant was dried in an oven at 120° C. for 12 hours. To the dried powder, lithium hydroxide monohydrate ($LiOH.H_2O$) was added so as to adjust a molar ratio of Li/(Ni+Co) at 103/100. There was thus prepared an intermediate. This intermediate was calcined in an oxygen gas stream at 700° C. for 10 hours, thereby obtaining a positive electrode material.

The prepared positive electrode active material was a material mainly composed of a lithium nickelate having a composition formula represented by $Li_{1.03}Ni_{0.75}Co_{0.20}Al_{0.05}O_2$, with $\{(z/y)+0.425\}$ being 4.175. Also, an average particle size of this particle was 13 μm as measured by the laser scattering method. This positive electrode active material was in a state of a secondary particle obtained upon aggregation of almost all of primary particles of the complex oxide particle having the foregoing composition formula.

[Confirmation of Composition of Co and Ni of Positive Electrode Active Material]

Here, a Co/Ni composition ratio in the obtained positive electrode active material was determined in the following method.

(i) Composition Ratio Rs/Ri in the Vicinity of the Surface and in the Vicinity of the Center of Secondary Particle Each of Rs that is a Co/Ni ratio in the primary particle positioned in the vicinity of the surface of the secondary particle constituting the positive electrode active material and Ri that is a Co/Ni ratio in the primary particle positioned in the vicinity of the center of the secondary particle was measured, and Rs/Ri was calculated. As a result, Rs/Ri was found to be 1.01.

Figure 6:
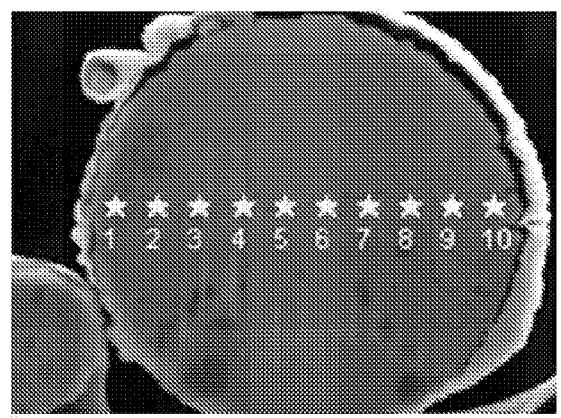
FIG. 6 is a sectional view showing analysis points of EDX.

Incidentally, as to the measurement of Rs and Ri, as shown in FIG. 6, a section was cutout so as to pass through a central part of the secondary particulate positive electrode active material particle, and point analysis of EDX (accelerating voltage: 15 kV) was performed at intervals of about 1 μm so as to pass through substantially the center. Rs was determined from an average of the Co/Ni ratios at every two points close to the surface among analysis points shown in FIG. 6 (namely, analysis points 1, 2, 9 and 10). Also, Ri was determined from an average of the Co/Ni ratios at all of the points excluding the four points close to the surface as used in the calculation of Rs (namely, analysis points 3 to 8).

(ii) Composition Ratio Rt/R on the Topmost Surface of the Primary Particle Constituting the Secondary Particle and the Whole of the Primary Particle Rt that is a Co/Ni ratio in the vicinity of the surface of the primary particle constituting the secondary particle of the positive electrode active material was measured, and Rt/R was calculated using R that is a Co/Ni ratio of the whole of the positive electrode active material as determined from the composition of the positive electrode active material. As a result, Rt/R was found to be 2.14.

Incidentally, Rt was determined by the measurement by means of XPS.

Subsequently, 85 parts by mass of the above-obtained positive electrode active material, 5 parts by mass of graphite that is a conductive agent and 10 parts by mass of polyvinylidene fluoride that is a binder were mixed to prepare a positive electrode mixture. Subsequently, this positive electrode mixture was dispersed in N-methyl-2-pyrrolidone that is a dispersion medium, thereby preparing a positive electrode mixture slurry. This positive electrode mixture slurry was uniformly coated on a positive electrode collector made of an aluminum (Al) foil having a thickness of 20 μm and then dried. The resultant was compression molded by a roll press, thereby forming a positive electrode active material layer. There was thus fabricated a positive electrode. The electrode was thoroughly dipped in ion-exchanged water, dried with dry air and then wound up. The resultant was dried in vacuo at 120° C. for 10 hours. A water content of the positive electrode after the treatment was 150 ppm. Thereafter, a positive electrode terminal was installed in the positive electrode.

[XAFS Measurement of Positive Electrode]

Subsequently, the XAFS measurement of the positive electrode was performed in the following method.

A coin type battery having the structure shown in FIG. 5 was fabricated using the positive electrode and a lithium foil as a counter electrode. First of all, the positive electrode was housed in a positive electrode can, and the lithium foil was placed thereon via a separator. Then, an electrolytic solution was injected, a negative electrode can was covered thereon via a gasket, and the negative electrode can and the positive electrode can were hermetically sealed upon being caulked, thereby fabricating a coin type battery.

The thus fabricated coin type battery was charged at 1 mA to an upper voltage of 4.250 V and then discharged to a discharge final voltage of 2.50 V, followed by relaxing for 2 hours. After relaxation, the positive electrode was taken out from the coin type battery and subjected to XAFS measurement of the positive electrode in the following manner. As a result, $\mu Ni/\mu Co$ was found to be 4.173.

Incidentally, the conversion electron yield method was adopted for the XAFS measurement. In the obtained XAFS spectrum, there were confirmed a K absorption edge of Co in which the absorption edge energy had a peak position between 7462.0 eV and 8462.0 eV and a K absorption edge of Ni in which the absorption edge energy had a peak position between 8082.0 eV and 9130.0 eV. Then, a jump amount of the XAFS spectrum between 7462.0 eV and 8462.0 eV obtained by the conversion electron yield method was defined as $\mu Co$, and a jump amount of the XAFS spectrum between 8082.0 eV and 9130.0 eV obtained by the conversion electron yield method was defined as $\mu Ni$.

[Fabrication of Negative Electrode]

A pulverized graphite powder was prepared as a negative electrode active material. 90 parts by mass of this graphite powder and 10 parts by mass of polyvinylidene fluoride that is a binder were mixed to prepare a negative electrode mixture, and this was dispersed in N-methyl-2-pyrrolidone that is a dispersion medium, thereby preparing a negative electrode mixture slurry. Subsequently, this negative electrode mixture slurry was uniformly coated on the both surfaces of a negative electrode collector made of a copper (Cu) foil having a thickness of 15 μm and then dried. The resultant was compression molded by a roll press, thereby forming a negative electrode active material layer. There was thus fabricated a negative electrode. Subsequently, a negative electrode terminal was installed in the negative electrode.

[Assembling of Laminated Film Type Battery]

The fabricated positive electrode and negative electrode were brought into intimate contact with each other via a separator made of a microporous polyethylene film having a thickness of 25 μm and wound in a longitudinal direction, and a protective tape was stuck to an outermost peripheral part, thereby fabricating a wound electrode body. Subsequently, the wound electrode body was packaged by a package member made of a laminated film, and three sides of the package member were heat fused. For the package member, a moisture proof aluminum laminated film obtained by laminating a 25 μm-thick nylon film, a 40 μm-thick aluminum foil and a 30 μm-thick polypropylene film in this order from the outermost layer was used.

Subsequently, an electrolytic solution was injected into the inside of the package member in a bag form. The electrolytic solution was prepared by dissolving 1 mole/L of $LiPF_6$ as an electrolyte salt in a nonaqueous solvent of a mixture of ethylene carbonate (EC) and ethyl methyl carbonate (EMC) in a mass ratio of 5/5. Finally, the remaining one side of the package member was heat fused under reduced pressure to hermetically seal the package member. There was thus fabricated a laminated film type battery.

Example 2

A positive electrode mainly composed of a lithium nickelate is fabricated in the same manner as in Example 1. Example 2 is different from Example 1 on the point that the addition of aluminum hydroxide is performed at the preparation of an intermediate but not at the preparation of a precursor.

Nickel sulfate ($NiSO_4$) and cobalt sulfate ($CoSO_4$) were dissolved in water, and a sodium hydroxide (NaOH) solution was added while thoroughly stirring, thereby obtaining a nickel-cobalt complex coprecipitated hydroxide having a molar ratio of Ni to Co of 90/10. The produced coprecipitate was washed with water and dried, and thereafter, only lithium hydroxide monohydrate ($LiOH.H_2O$) was added so as to adjust a molar ratio of Li/(Ni+Co) at 103/100. There was thus obtained a precursor.

Subsequently, the precursor was calcined in an oxygen gas stream at 500° C. for 10 hours. This 500° C.-calcined powder was taken out, pulverized and dispersed in 100 g of ion-exchanged water. 63 mL of a 2.0 moles/L cobalt nitrate aqueous solution was added, sodium hydroxide was added such that a pH of the dispersion liquid was 12, and the mixture was stirred for one hour. Furthermore, the calcined powder was washed with 1 L of ion-exchanged water and subjected to suction filtration, and the resultant was dried in an oven at 120° C. for 12 hours. To the dried powder, aluminum hydroxide ($Al(OH)_3$)) was added together with lithium hydroxide monohydrate ($LiOH.H_2O$) so as to adjust a molar ratio of Li/(Ni+Co+Al) at 103/100. There was thus prepared an intermediate. This intermediate was calcined in an oxygen gas stream at 700° C. for 10 hours, thereby obtaining a positive electrode active material. Then, a laminated film type battery was fabricated using this positive electrode active material.

The prepared positive electrode active material was a material mainly composed of a lithium nickelate having a composition formula represented by $Li_{1.03}Ni_{0.75}Co_{0.20}Al_{0.05}O_2$, with $\{(z/y)+0.425\}$ being 4.175. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.25. Also, Rt/R was calculated in the same method as in Example 1. As a result, it was found to be 1.12.

Also, in a positive electrode fabricated using the foregoing positive electrode active material, the XAFS measurement was performed in the same method as in Example 1, thereby determining $\mu Ni/\mu Co$. As a result, $\mu Ni/\mu Co$ was found to be 4.171.

Example 3

A positive electrode active material was obtained in the same manner as in Example 2, except that at the preparation of a precursor, Ni/Co was adjusted at 95/5 to obtain a nickel-cobalt complex coprecipitated hydroxide, and at the preparation of an intermediate, the addition amount of the cobalt nitrate aqueous solution was set to be 94 mL. Then, a laminated film type battery was fabricated using this positive electrode active material.

The prepared positive electrode active material was a material mainly composed of a lithium nickelate having a composition formula represented by $Li_{1.03}Ni_{0.75}Co_{0.20}Al_{0.05}O_2$, with $\{(z/y)+0.425\}$ being 4.175. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 4.20. Also, Rt/R was calculated in the same method as in Example 1. As a result, it was found to be 1.03.

Also, in a positive electrode fabricated using the foregoing positive electrode active material, the XAFS measurement was performed in the same method as in Example 1, thereby determining μNi/μCo. As a result, μNi/μCo was found to be 4.165.

Example 4

At the preparation of a precursor, only nickel nitrate was dissolved in water, and furthermore, a sodium hydroxide solution was added while thoroughly stirring, thereby obtaining nickel hydroxide. This nickel hydroxide was washed with water and dried, and thereafter, lithium hydroxide monohydrate was added so as to adjust a molar ratio of Li/Ni at 103/100. Also, at the preparation of an intermediate, the addition amount of the cobalt nitrate aqueous solution was set to be 125 mL. A positive electrode active material was obtained in the same manner as in Example 2, except for these points. Then, a laminated film type battery was fabricated using this positive electrode active material.

The prepared positive electrode active material was a material mainly composed of a lithium nickelate having a composition formula represented by $Li_{1.03}Ni_{0.75}Co_{0.20}Al_{0.05}O_2$, with $\{(z/y)+0.425\}$ being 4.175. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 11.32. Also, Rt/R was calculated in the same method as in Example 1. As a result, it was found to be 2.56.

Also, in a positive electrode fabricated using the foregoing positive electrode active material, the XAFS measurement was performed in the same method as in Example 1, thereby determining μNi/μCo. As a result, μNi/μCo was found to be 4.161.

Example 5

A positive electrode active material was obtained in the same manner as in Example 1, except that at the preparation of a precursor, aluminum hydroxide was not added, and at the preparation of an intermediate, the addition amount of the cobalt nitrate aqueous solution was set to be 63 mL. Then, a laminated film type battery was fabricated using this positive electrode active material.

The prepared positive electrode active material was a material mainly composed of a lithium nickelate having a composition formula represented by $Li_{1.03}Ni_{0.80}Co_{0.20}O_2$, with $\{(z/y)+0.425\}$ being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.03. Also, Rt/R was calculated in the same method as in Example 1. As a result, it was found to be 4.65.

Also, in a positive electrode fabricated using the foregoing positive electrode active material, the XAFS measurement was performed in the same method as in Example 1, thereby determining μNi/μCo. As a result, μNi/μCo was found to be 4.301.

Example 6

A positive electrode active material was obtained in the same manner as in Example 5, except that at the preparation of a precursor, a nickel-cobalt complex coprecipitated hydroxide was prepared so as to have a molar ratio of Ni to Co of 90/10. Then, a laminated film type battery was fabricated using this positive electrode active material.

The prepared positive electrode active material was a material mainly composed of a lithium nickelate having a composition formula represented by $Li_{1.03}Ni_{0.80}Co_{0.20}O_2$, with $\{(z/y)+0.425\}$ being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.19. Also, Rt/R was calculated in the same method as in Example 1. As a result, it was found to be 0.72.

Also, in a positive electrode fabricated using the foregoing positive electrode active material, the XAFS measurement was performed in the same method as in Example 1, thereby determining μNi/μCo. As a result, μNi/μCo was found to be 4.277.

Example 7

A positive electrode active material was obtained in the same manner as in Example 5, except that at the preparation of a precursor, a nickel-cobalt complex coprecipitated hydroxide was prepared so as to have a molar ratio of Ni to Co of 95/5, and at the preparation of an intermediate, the addition amount of the cobalt nitrate aqueous solution was set to be 94 mL. Then, a laminated film type battery was fabricated using this positive electrode active material.

The prepared positive electrode active material was a material mainly composed of a lithium nickelate having a composition formula represented by $Li_{1.03}Ni_{0.80}Co_{0.20}O_2$, with $\{(z/y)+0.425\}$ being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 7.16. Also, Rt/R was calculated in the same method as in Example 1. As a result, it was found to be 0.76.

Also, in a positive electrode fabricated using the foregoing positive electrode active material, the XAFS measurement was performed in the same method as in Example 1, thereby determining $\mu Ni/\mu Co$. As a result, $\mu Ni/\mu Co$ was found to be 4.220.

Example 8

At the preparation of a precursor, only nickel nitrate was dissolved in water, and furthermore, a sodium hydroxide solution was added while thoroughly stirring, thereby obtaining nickel hydroxide. This nickel hydroxide was washed with water and dried, and thereafter, only lithium hydroxide monohydrate was added so as to adjust a molar ratio of Li/Ni at 103/100. Also, at the preparation of an intermediate, the addition amount of the cobalt nitrate aqueous solution was set to be 125 mL. A positive electrode active material was obtained in the same manner as in Example 5, except for these points. Then, a laminated film type battery was fabricated using this positive electrode active material.

The prepared positive electrode active material was a material mainly composed of a lithium nickelate having a composition formula represented by $Li_{1.03}Ni_{0.80}Co_{0.20}O_2$, with $\{(z/y)+0.425\}$ being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 17.31. Also, Rt/R was calculated in the same method as in Example 1. As a result, it was found to be 1.34.

Also, in a positive electrode fabricated using the foregoing positive electrode active material, the XAFS measurement was performed in the same method as in Example 1, thereby determining $\mu Ni/\mu Co$. As a result, $\mu Ni/\mu Co$ was found to be 4.195.

Example 9

At the preparation of a precursor, only nickel nitrate was dissolved in water, and furthermore, a sodium hydroxide solution was added while thoroughly stirring, thereby obtaining nickel hydroxide. This nickel hydroxide was washed with water and dried, and thereafter, only lithium hydroxide monohydrate was added so as to adjust a molar ratio of Li/Ni at 103/100. Also, at the preparation of an intermediate, the addition amount of the cobalt nitrate aqueous solution was set to be 56 mL. A positive electrode active material was obtained in the same manner as in Example 1, except for these points. Then, a laminated film type battery was fabricated using this positive electrode active material.

The prepared positive electrode active material was a material mainly composed of a lithium nickelate having a composition formula represented by $Li_{1.03}Ni_{0.75}Co_{0.20}Al_{0.05}O_2$, with $\{(z/y)+0.425\}$ being 9.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.23. Also, Rt/R was calculated in the same method as in Example 1. As a result, it was found to be 1.12.

Also, in a positive electrode fabricated using the foregoing positive electrode active material, the XAFS measurement was performed in the same method as in Example 1, thereby determining $\mu Ni/\mu Co$. As a result, $\mu Ni/\mu Co$ was found to be 9.181.

Example 10

At the preparation of a precursor, a nickel-cobalt complex coprecipitated hydroxide was prepared so as to have a molar ratio of Ni to Co of 90/10, and only lithium hydroxide monohydrate ($LiOH.H_2O$) was added without adding aluminum hydroxide. Also, at the preparation of an intermediate, the addition amount of the cobalt nitrate aqueous solution was set to be 72 mL. A positive electrode active material was obtained in the same manner as in Example 1, except for these points. Then, a laminated film type battery was fabricated using this positive electrode active material.

The prepared positive electrode active material was a material mainly composed of a lithium nickelate having a composition formula represented by $Li_{1.03}Ni_{0.70}Co_{0.30}O_2$, with $\{(z/y)+0.425\}$ being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.03. Also, Rt/R was calculated in the same method as in Example 1. As a result, it was found to be 4.65.

Also, in a positive electrode fabricated using the foregoing positive electrode active material, the XAFS measurement was performed in the same method as in Example 1, thereby determining $\mu Ni/\mu Co$. As a result, $\mu Ni/\mu Co$ was found to be 4.301.

Comparative Example 1

Nickel sulfate ($NiSO_4$) and cobalt sulfate ($CoSO_4$) were dissolved in water, and a sodium hydroxide (NaOH) solution was added while thoroughly stirring, thereby obtaining a nickel-cobalt complex coprecipitated hydroxide having a molar ratio of Ni to Co of 80/20. The produced coprecipitate was washed with water and dried, and thereafter, lithium hydroxide monohydrate ($LiOH.H_2O$) and aluminum hydroxide ($Al(OH)_3$) were added so as to adjust a molar ratio of Li/(Ni+Co+Al) at 103/100. There was thus obtained a precursor.

Subsequently, the precursor was calcined in an oxygen gas stream at 500° C. for 10 hours. Thereafter, the calcined precursor was cooled to room temperature, taken out and then pulverized. The resultant was stirred and washed with 1 L of ion-exchanged water, and then calcined in an oxygen gas stream at 700° C. for 10 hours, thereby obtaining a positive electrode active material. Then, a laminated film type battery was fabricated using this positive electrode active material.

The prepared positive electrode active material was a material mainly composed of a lithium nickelate having a composition formula represented by $Li_{1.03}Ni_{0.75}Co_{0.20}Al_{0.05}O_2$, with {(z/y)+0.425} being 4.175. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 0.98. Also, Rt/R was calculated in the same method as in Example 1. As a result, it was found to be 0.79.

Also, in a positive electrode fabricated using the foregoing positive electrode active material, the XAFS measurement was performed in the same method as in Example 1, thereby determining μNi/μCo. As a result, μNi/μCo was found to be 4.329.

Comparative Example 2

A positive electrode active material was obtained in the same manner as in Comparative Example 1, except that at the preparation of a precursor, only nickel nitrate was dissolved in water without using aluminum hydroxide. Then, a laminated film type battery was fabricated using this positive electrode active material.

The prepared positive electrode active material was a material mainly composed of a lithium nickelate having a composition formula represented by $Li_{1.03}Ni_{0.80}Co_{0.20}O_2$, with {(z/y)+0.425} being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.03. Also, Rt/R was calculated in the same method as in Example 1. As a result, it was found to be 0.88.

Also, in a positive electrode fabricated using the foregoing positive electrode active material, the XAFS measurement was performed in the same method as in Example 1, thereby determining μNi/μCo. As a result, μNi/μCo was found to be 4.427.

Comparative Example 3

A positive electrode active material was obtained in the same manner as in Comparative Example 1, except that at the preparation of a precursor, only nickel nitrate was dissolved in water without adding aluminum hydroxide, and the calcination temperature at the time of calcining the precursor was set to be 700° C. Then, a laminated film type battery was fabricated using this positive electrode active material.

The prepared positive electrode active material was a material mainly composed of a lithium nickelate having a composition formula represented by $Li_{1.03}Ni_{0.80}Co_{0.20}O_2$, with {(z/y)+0.425} being 4.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 0.94. Also, Rt/R was calculated in the same method as in Example 1. As a result, it was found to be 37.21.

Also, in a positive electrode fabricated using the foregoing positive electrode active material, the XAFS measurement was performed in the same method as in Example 1, thereby determining μNi/μCo. As a result, μNi/μCo was found to be 1.282.

Comparative Example 4

A positive electrode active material was obtained in the same manner as in Comparative Example 1, except that at the preparation of a precursor, a nickel-cobalt complex coprecipitated hydroxide was prepared so as to have a molar ratio of Ni to Co of 90/10. Then, a laminated film type battery was fabricated using this positive electrode active material.

The prepared positive electrode active material was a material mainly composed of a lithium nickelate having a composition formula represented by $Li_{1.03}Ni_{0.90}Co_{0.10}O_2$, with {(z/y)+0.425} being 9.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.01. Also, Rt/R was calculated in the same method as in Example 1. As a result, it was found to be 0.97.

Also, in a positive electrode fabricated using the foregoing positive electrode active material, the XAFS measurement was performed in the same method as in Example 1, thereby determining μNi/μCo. As a result, μNi/μCo was found to be 10.536.

Comparative Example 5

A positive electrode active material was obtained in the same manner as in Comparative Example 1, except that at the preparation of a precursor, a nickel-cobalt complex coprecipitated hydroxide was prepared so as to have a molar ratio of Ni to Co of 70/30. Then, a laminated film type battery was fabricated using this positive electrode active material.

The prepared positive electrode active material was a material mainly composed of a lithium nickelate having a composition formula represented by $Li_{1.03}Ni_{0.70}Co_{0.30}O_2$, with {(z/y)+0.425} being 9.425. Also, an average particle size of this particle was 13 μm as measured by the laser scattering method. This positive electrode active material was in a state of a secondary particle obtained upon aggregation of almost all of primary particles of the complex oxide particle having the foregoing composition formula.

As to the foregoing positive electrode active material, Rs/Ri was calculated in the same method as in Example 1. As a result, it was found to be 1.01. Also, Rt/R was calculated in the same method as in Example 1. As a result, it was found to be 0.97.

Also, in a positive electrode fabricated using the foregoing positive electrode active material, the XAFS measurement was performed in the same method as in Example 1, thereby determining μNi/μCo. As a result, μNi/μCo was found to be 10.536.

Constitutions of the positive electrode active materials of the foregoing Examples 1 to 10 and Comparative Examples 1 to 5 and a part of the formation condition of the positive electrode active material are shown in the following Table 1.

TABLE 1

| | Positive electrode active material | | | Precursor | | First calcination | Intermediate | | Second calcination |
|---|---|---|---|---|---|---|---|---|---|
| | Composition formula | (z/y) + 0.425 | Average particle size [μm] | Ni/Co | Addition of aluminum hydroxide | Calcination temperature [°C.] | Cobalt nitrate | Addition of aluminum hydroxide | Calcination temperature [°C.] |
| Example 1 | $Li_{1.03}Ni_{0.75}Co_{0.20}Al_{0.05}O_2$ | 4.175 | 13 | 85/15 | Yes | 500 | 32 | No | 700 |
| Example 2 | $Li_{1.03}Ni_{0.75}Co_{0.20}Al_{0.05}O_2$ | 4.175 | 13 | 90/10 | No | 500 | 63 | Yes | 700 |
| Example 3 | $Li_{1.03}Ni_{0.75}Co_{0.20}Al_{0.05}O_2$ | 4.175 | 13 | 95/5 | No | 500 | 94 | Yes | 700 |
| Example 4 | $Li_{1.03}Ni_{0.75}Co_{0.20}Al_{0.05}O_2$ | 4.175 | 13 | Not added $CoSO_4$ | No | 500 | 125 | Yes | 700 |
| Example 5 | $Li_{1.03}Ni_{0.80}Co_{0.20}O_2$ | 4.425 | 13 | 85/15 | No | 500 | 63 | No | 700 |
| Example 6 | $Li_{1.03}Ni_{0.80}Co_{0.20}O_2$ | 4.425 | 13 | 90/10 | No | 500 | 63 | No | 700 |
| Example 7 | $Li_{1.03}Ni_{0.80}Co_{0.20}O_2$ | 4.425 | 13 | 95/5 | No | 500 | 94 | No | 700 |
| Example 8 | $Li_{1.03}Ni_{0.80}Co_{0.20}O_2$ | 4.425 | 13 | Not added $CoSO_4$ | No | 500 | 125 | No | 700 |
| Example 9 | $Li_{1.03}Ni_{0.90}Co_{0.10}O_2$ | 9.425 | 13 | Not added $CoSO_4$ | No | 500 | 56 | No | 700 |
| Example 10 | $Li_{1.03}Ni_{0.70}Co_{0.30}O_2$ | 2.758 | 13 | 80/20 | No | 500 | 72 | No | 700 |
| Comparative Example 1 | $Li_{1.03}Ni_{0.75}Co_{0.20}Al_{0.05}O_2$ | 4.175 | 13 | 80/20 | Yes | 500 | — | — | 700 |
| Comparative Example 2 | $Li_{1.03}Ni_{0.80}Co_{0.20}O_2$ | 4.425 | 13 | 80/20 | No | 500 | — | — | 700 |
| Comparative Example 3 | $Li_{1.03}Ni_{0.80}Co_{0.20}O_2$ | 4.425 | 13 | 80/20 | No | 700 | — | — | 700 |
| Comparative Example 4 | $Li_{1.03}Ni_{0.90}Co_{0.10}O_2$ | 9.425 | 13 | 90/10 | No | 500 | — | — | 700 |
| Comparative Example 5 | $Li_{1.03}Ni_{0.70}Co_{0.30}O_2$ | 2.758 | 13 | 70/30 | No | 500 | — | — | 700 |

[Evaluation of Laminated Film Type Battery]
(a) Measurement of Discharge Capacity:
Each of the fabricated laminated film type batteries was subjected to constant-current charge at a constant current of 1A in an environment at 23° C. until the battery voltage reached 4.20 V and then discharged at a constant current of 200 mA to 2.50 V, thereby measuring a discharge capacity.
(b) Measurement of Blister at the Storage in a High-Temperature Environment at the Full Charge
Each of the fabricated laminated film type batteries was subjected to constant-current charge at a constant current of 1A in an environment at 23° C. until the battery voltage reached 4.20 V and then discharged at a constant current of 200 mA to 2.50 V. Subsequently, the battery was subjected to constant-current charge at a constant current of 1A in an environment at 23° C. until the battery voltage reached 4.20 V and then subjected to constant-voltage charge at a constant voltage with a battery voltage of 4.20 V until the current value reached 50 mA, thereby achieving full charge, followed by measuring a thickness of the laminated film type battery. Subsequently, the battery was stored in an environment at 85° C. for 12 hours, and a thickness of the laminated film type battery after the storage was measured. Finally, blister at the storage in a high-temperature environment at the full charge was calculated according to the following expression.

Blister at the high-temperature storage at the full charge [mm]=(Battery thickness after storage)−(Battery thickness before storage)

A variation amount was measured as a blister amount at the high-temperature storage.
The evaluation results are shown in the following Table 2.

TABLE 2

| | Positive electrode active material | (z/y) + 0.425 | μNi/μCo | Rs/Ri | Rt/R | K absorption edge energy [eV] | | Discharge capacity [mAh/g] | Blister at the high-temperature storage at the full charge [mm] |
|---|---|---|---|---|---|---|---|---|---|
| | | | | | | Co | Ni | | |
| Example 1 | $Li_{1.03}Ni_{0.75}Co_{0.20}Al_{0.05}O_2$ | 4.175 | 4.173 | 1.01 | 2.14 | 7722.3 | 8342.7 | 184 | 0.97 |
| Example 2 | $Li_{1.03}Ni_{0.75}Co_{0.20}Al_{0.05}O_2$ | 4.175 | 4.171 | 1.25 | 1.12 | 7722.3 | 8342.6 | 184 | 0.64 |
| Example 3 | $Li_{1.03}Ni_{0.75}Co_{0.20}Al_{0.05}O_2$ | 4.175 | 4.165 | 4.20 | 1.03 | 7722.2 | 8342.4 | 185 | 0.33 |
| Example 4 | $Li_{1.03}Ni_{0.75}Co_{0.20}Al_{0.05}O_2$ | 4.175 | 4.161 | 11.32 | 2.56 | 7722.1 | 8342.2 | 186 | 0.21 |
| Example 5 | $Li_{1.03}Ni_{0.80}Co_{0.20}O_2$ | 4.425 | 4.301 | 1.03 | 4.65 | 7722.7 | 8343.4 | 192 | 1.00 |
| Example 6 | $Li_{1.03}Ni_{0.80}Co_{0.20}O_2$ | 4.425 | 4.277 | 1.19 | 0.72 | 7722.3 | 8343.2 | 197 | 0.78 |
| Example 7 | $Li_{1.03}Ni_{0.80}Co_{0.20}O_2$ | 4.425 | 4.220 | 7.16 | 0.76 | 7722.2 | 8342.9 | 198 | 0.32 |
| Example 8 | $Li_{1.03}Ni_{0.80}Co_{0.20}O_2$ | 4.425 | 4.195 | 17.31 | 1.34 | 7722.1 | 8342.7 | 198 | 0.21 |
| Example 9 | $Li_{1.03}Ni_{0.90}Co_{0.10}O_2$ | 9.425 | 9.181 | 1.23 | 1.12 | 7722.6 | 8342.8 | 200 | 0.75 |
| Example 10 | $Li_{1.03}Ni_{0.70}Co_{0.30}O_2$ | 2.758 | 2.653 | 4.34 | 1.03 | 7722.2 | 8342.9 | 185 | 0.43 |
| Comparative Example 1 | $Li_{1.03}Ni_{0.75}Co_{0.20}Al_{0.05}O_2$ | 4.175 | 4.329 | 0.98 | 0.79 | 7723.0 | 8344.0 | 180 | 2.15 |
| Comparative Example 2 | $Li_{1.03}Ni_{0.80}Co_{0.20}O_2$ | 4.425 | 4.427 | 1.03 | 0.88 | 7722.9 | 8344.2 | 184 | 2.40 |
| Comparative | $Li_{1.03}Ni_{0.80}Co_{0.20}O_2$ | 4.425 | 1.282 | 0.94 | 37.21 | 7722.9 | 8343.5 | 179 | 2.60 |

TABLE 2-continued

| Positive electrode active material | (z/y) + 0.425 | µNi/µCo | Rs/Ri | Rt/R | K absorption edge energy [eV] Co | Ni | Discharge capacity [mAh/g] | Blister at the high-temperature storage at the full charge [mm] |
|---|---|---|---|---|---|---|---|---|
| Example 3 | | | | | | | | |
| Comparative Example 4  $Li_{1.03}Ni_{0.90}Co_{0.10}O_2$ | 9.425 | 10.536 | 1.01 | 0.97 | 7723.1 | 8344.1 | 194 | 2.56 |
| Comparative Example 5  $Li_{1.03}Ni_{0.70}Co_{0.30}O_2$ | 2.758 | 2.873 | 0.99 | 1.06 | 7722.8 | 8343.9 | 180 | 1.38 |

Figure 7A:
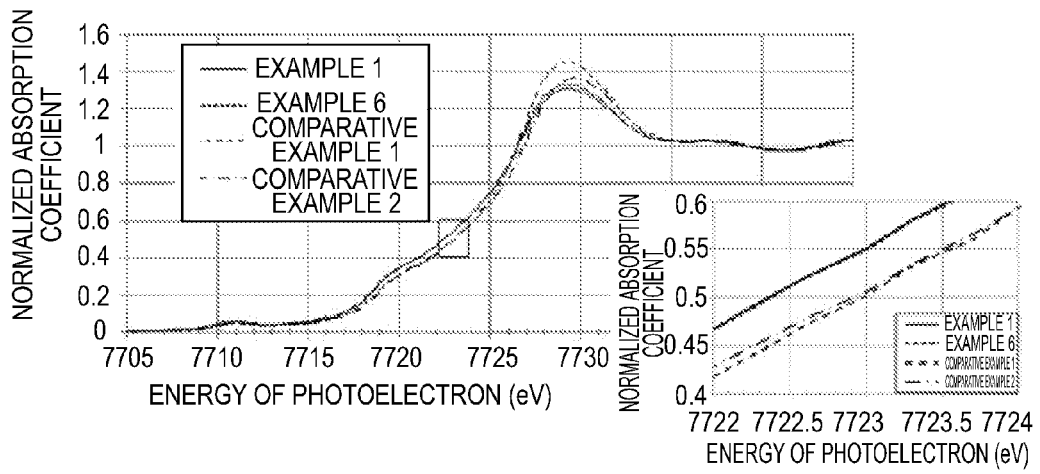
FIGS. 7A and 7B are graphs showing XANES spectra of Example 1, Example 6, Comparative Example 1 and Comparative Example 2, respectively obtained by the transmission method.
Figure 7B:
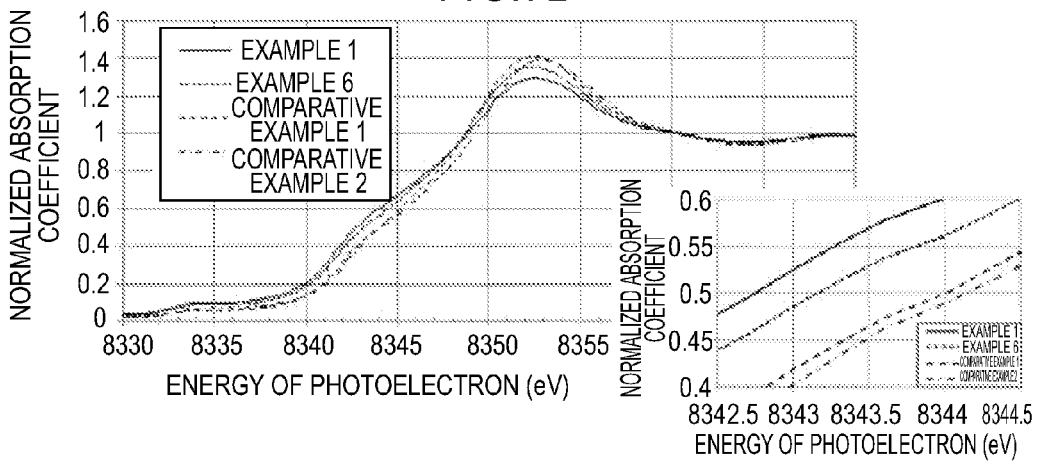

Also, as representative examples of the XANES spectra, XANES spectra of Example 1, Example 6, Comparative Example 1 and Comparative Example 2 obtained by the transmission method are shown in FIGS. 7A and 7B, respectively.

Figure 8:
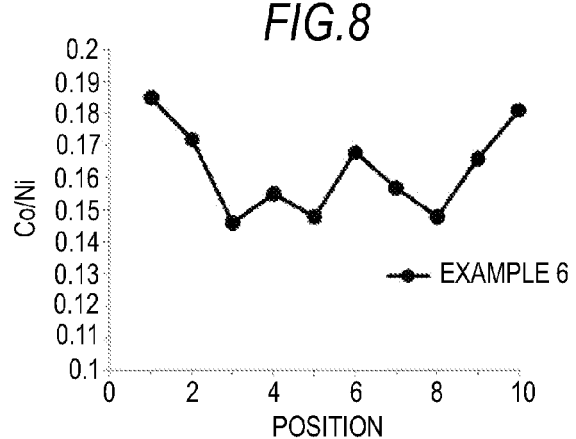
FIG. 8 is a graph showing a Co/Ni ratio of Example 6 at the analysis points shown in FIG. 6.

Furthermore, the Co/Ni ratio of Example 6 at the analysis points shown in FIG. 6 is shown in FIG. 8.

As noted from the respective Examples in Table 2, in the case of a structure satisfying the relational expression (1): $\mu Ni/\mu Co < (z/y)+0.425$, not only the discharge capacity was enhanced, but the battery blister at the storage in a high-temperature environment was reduced. Then, as noted from the comparison between Example 5 and Comparative Example 2 or Comparative Example 3, in the case of satisfying, in addition to the expression (1), the expression (2): $1.5 < Rt/R < 35$, the battery blister at the storage in a high-temperature environment was more conspicuously reduced. Also, as noted from the comparison between Example 3 and Comparative Example 1, in the case of satisfying, in addition to the expression (1), the expression (3): $1.05 < Rs/Ri < 25$, the battery blister at the storage in a high-temperature environment was more conspicuously reduced while attaining a high discharge capacity. As in Examples 2 and 4 satisfying all of the expressions (1), (2) and (3), the battery blister at the storage in a high-temperature environment could be more conspicuously suppressed while keeping a high discharge capacity.

As to Example 10 and Comparative Example 5, $\mu Ni/\mu Co$ that is a ratio of the jump width obtained by the conversion electron yield method, the peak positions of the CoK and NiK absorption edges obtained by the XAFS measurement by the transmission method, Rs/Ri and Rt/R determined by the foregoing methods, and the results of the discharge capacity and the blister amount at the high-temperature storage at the full charge are shown in Table 2. As is clear from these results, in Example 10, the relation of $\mu Ni/\mu Co < \{(z/y)+0.425\}$ is satisfied; the existent amount of Co on the primary particle surface or secondary particle surface becomes large; the blister is small; the absorption edge of XANES is shifted to the low energy side; and the discharge capacity is large.

Also, as shown in FIG. 8, in the positive electrode active material of Example 6 manufactured by the method according to the present disclosure, at the analysis points 1, 2, 9 and 10 in the vicinity of the surface, the existent amount of cobalt (Co) was large, and at other analysis points, the existent amount of cobalt (Co) was small as compared with that in the vicinity of the surface.

On the other hand, in the manufacturing method of Comparative Example 3, though the expression (1): $\mu Ni/\mu Co < (z/y)+0.425$ is satisfied, Rt/R is more than 35, so that the expression (3) is not satisfied. It may be considered that this is caused due to the matter that the temperature of the first calcination is the same degree as the temperature of the second calcination, the crystal growth and particle growth at the time of first calcination completely proceed, and cobalt (Co) which is not completely covered in the sequent cobalt (Co) covering process becomes a fine powder and exists. In the active material containing such a fine powder, the discharge capacity is decreased, and the battery blister is large, and hence, such is not desirable.

While the present disclosure has been described with reference to the embodiments and working examples, it should not be construed that the present disclosure is limited to the foregoing embodiments and working examples, but various modifications can be made. For example, while the secondary battery having a wound structure has been described in the foregoing embodiments and working examples, the present disclosure is similarly applicable to secondary batteries having a structure in which a positive electrode and a negative electrode are folded or stacked. In addition, the present disclosure is also applicable to secondary batteries of a so-called coin type, button type, rectangular type or laminated film type or the like.

Also, in the foregoing embodiments and working examples, while the case of using a nonaqueous electrolytic solution has been described, the present disclosure is also applicable to the case of using a nonaqueous electrolyte in any form. Examples of the nonaqueous electrolyte in other form include a nonaqueous electrolyte in a so-called gel form in which a nonaqueous solvent and an electrolyte salt are held in a polymer compound.

Furthermore, in the foregoing embodiments and working examples, while a so-called lithium ion secondary battery in which the capacity of a negative electrode is expressed by a capacity component due to intercalation and deintercalation of lithium has been described, the present disclosure is also applicable to a so-called lithium metal secondary battery in which a lithium metal is used for a negative electrode active material, and the capacity of the negative electrode is expressed by a capacity component due to deposition and dissolution of lithium; or a secondary battery in which by making the charge capacity of a negative electrode material capable of intercalating and deintercalating lithium smaller than the charge capacity of a positive electrode, the capacity of a negative electrode includes a capacity component due to intercalation and deintercalation of lithium and a capacity component due to deposition and dissolution of lithium and is expressed by a total sum thereof.

Also, in the foregoing embodiments and working examples, while a battery using lithium as an electrode reactant has been described, the present disclosure is also applicable to the case of using other alkali metal such as sodium (Na) and potassium (K), an alkaline earth metal such as magnesium and calcium (Ca), or other light metal such as aluminum obtained.

The present disclosure contains subject matter related to that disclosed in Japanese Priority Patent Application JP 2010-155702 filed in the Japan Patent Office on Jul. 8, 2010, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A positive electrode active material comprising:
a secondary particle obtained upon aggregation of a primary particle that is a lithium complex oxide particle in which at least nickel (Ni) and cobalt (Co) are solid-solved as transition metals, wherein
an average composition of the whole of the secondary particle is represented by:

$$Li_xCo_yNi_zM_{1-y-z}O_{b-a}X_a$$

wherein
M represents at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb) and antimony (Sb); X represents a halogen atom; and x, y, z, a and b are values falling within the ranges of (0.8<x≤1.2), (0<y≤0.5), (0.5≤z≤1.0), (1.8≤b≤2.2) and (0≤a≤1.0), respectively;
an amount of cobalt (Co) becomes large from a center of the primary particle toward the surface thereof;
and an amount of cobalt (Co) in the primary particle existing in a vicinity of a surface of the secondary particle is larger than an amount of cobalt (Co) in the primary particle existing in a vicinity of the center of a secondary particle.

2. The positive electrode active material according to claim 1, wherein
when a jump amount of an X-ray absorption fine structure (XAFS) spectrum between 7462.0 eV and 8462.0 eV obtained by a conversion electron yield method of the lithium complex oxide particle represented by:

$$Li_xCo_yNi_zM_{1-y-z}O_{b-a}X_a$$

is defined as μCo, and a jump amount of an X-ray absorption fine structure (XAFS) spectrum between 8082.0eV and 9130.0 eV obtained by the conversion electron yield method of a lithium complex oxide represented by the formula (1) is defined as μNi, μNi/ μCo and z/y of the composition formula of the formula (1) are satisfied with a relation of:

$$\mu Ni/\mu Co<(z/y)+0.425.$$

3. The positive electrode active material according to claim 2, wherein when a Co/Ni ratio on a topmost surface of the primary particle is defined as Rt, and a Co/Ni ratio of a whole of the primary particle is defined as R, Rt and R are satisfied with a relation of:

$$1.5<Rt/R<35.$$

4. The positive electrode active material according to claim 2, wherein
when a Co/Ni ratio of the primary particle existing in the vicinity of the surface of the secondary particle is defined as Rs, and a Co/Ni ratio of the primary particle existing in the vicinity of the center of the secondary particle is defined as Ri, Rs and Ri are satisfied with a relation of:

$$1.05<Rs/RI<25.$$

5. The positive electrode active material according to claim 3, wherein
in a discharged state where a potential is from 2.5 V to 3.5 V (v.s. Li/Li⁻), in an X-ray absorption near edge structure (XANES) spectrum obtained by subtracting a linear background estimated in an absorption pre-edge region from the X-ray absorption fine structure (XAFS) spectrum between 7462 eV and 8462 eV and further normalizing in such a manner that an intensity of a secondary curve estimated in an absorption post-edge region is 1 over a whole region, cobalt K absorption edge energy at the time when its peak intensity is 0.5 lies on an energy side of 7722 eV or more and lower than 7723 eV.

6. The positive electrode active material according to claim 3, wherein
in a discharged state where a potential is from 2.5 V to 3.5 V (v.s. Li/Li³¹ ), in an X-ray absorption near edge structure (XANES) spectrum obtained by subtracting a linear background estimated in an absorption pre-edge region from the X-ray absorption fine structure (XAFS) spectrum between 8082 eV and 9130 eV and further normalizing in such a manner that an intensity of a secondary curve estimated in an absorption post-edge region is 1 over the whole region, nickel K absorption edge energy at the time when its peak intensity is 0.5 lies on an energy side of 8342 eV or more and lower than 8344 eV.

7. The positive electrode active material according to claim 1, having an average particle size of 2.0 μm or more and not more than 50 μm.

8. A nonaqueous electrolyte battery comprising: a positive electrode having a positive electrode active material-containing positive electrode active material layer provided on a positive electrode collector;
a negative electrode;
a nonaqueous electrolyte; and
a separator,
wherein
the positive electrode active material is composed of a secondary particle obtained upon aggregation of a primary particle that is a lithium complex oxide particle in which at least nickel (Ni) and cobalt (Co) are solid-solved as transition metals;
an average composition of a whole of the secondary particle is represented by:

$$Li_xCo_yNi_zM_{1-y-z}O_{b-a}X_a$$

wherein
M represents at least one element selected from the group consisting of boron (B), magnesium (Mg), aluminum (Al), silicon (Si), phosphorus (P), sulfur (S), titanium (Ti), chromium (Cr), manganese (Mn), iron (Fe), copper (Cu), zinc (Zn), gallium (Ga), germanium (Ge), yttrium (Y), zirconium (Zr), molybdenum (Mo), silver (Ag), barium (Ba), tungsten (W), indium (In), strontium (Sr), tin (Sn), lead (Pb) and antimony (Sb); X represents a halogen atom; and x, y, z, a and b are values falling within the ranges of (0.8<x≤1.2), (0<y≤0.5), (0.5≤s≤1.0), (1.8≤b≤2.2) and (0≤a≤1.0), respectively;
an amount of cobalt (Co) becomes large from a center of the primary particle toward a surface thereof; and
an amount of cobalt (Co) in the primary particle existing in a vicinity of a surface of the secondary particle is larger than an amount of cobalt (Co) in the primary particle existing in a vicinity of the center of a secondary particle.

9. The positive electrode active material according to claim 1, wherein M represents at least one element selected from the group consisting of boron (B), silicon (Si), phosphorus (P), sulfur (S), titanium (Ti), chromium (Cr), germanium (Ge), molybdenum (Mo), silver (Ag), barium (Ba), tungsten (W), indium (In), strontium (Sr), tin (Sn), lead (Pb), and antimony (Sb).

10. The positive electrode active material according to claim 1, wherein M does not comprise magnesium (Mg), aluminum (Al), manganese (Mn), iron (Fe), copper (Cu), zinc (Zn), gallium (Ga), yttrium (Y), and zirconium (Zr).

* * * * *